United States Patent
Rassier et al.

(10) Patent No.: US 8,667,611 B2
(45) Date of Patent: Mar. 4, 2014

(54) METHOD AND APPARATUS FOR MEASURING CANTILEVER DEFLECTION IN CONSTRAINED SPACES

(75) Inventors: Dilson Rassier, Montreal (CA); Aleksander Labuda, Montreal (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 157 days.

(21) Appl. No.: 13/097,197

(22) Filed: Apr. 29, 2011

(65) Prior Publication Data
US 2011/0271411 A1 Nov. 3, 2011

Related U.S. Application Data

(60) Provisional application No. 61/329,182, filed on Apr. 29, 2010.

(51) Int. Cl.
*G01Q 20/02* (2010.01)
*G01Q 20/00* (2010.01)

(52) U.S. Cl.
CPC ............ *G01Q 20/02* (2013.01); *G01Q 20/00* (2013.01)
USPC ...................... 850/6; 850/5; 850/33

(58) Field of Classification Search
CPC ............ Y10S 977/862; Y10S 977/863; Y10S 977/873; G01Q 20/02; G01Q 30/02; G01Q 60/06
USPC ................................ 850/5, 6, 21, 33
See application file for complete search history.

(56) References Cited

U.S. PATENT DOCUMENTS 5,825,020 A * 10/1998 Hansma et al. ............ 250/216

\* cited by examiner

*Primary Examiner* — Nicole Ippolito
*Assistant Examiner* — Hanway Chang
(74) *Attorney, Agent, or Firm* — The Law Office of Michael E. Kondoudis

(57) ABSTRACT

Atomic Force Microscopes (AFMs) allow forces within systems under observation to be probed from the piconewton forces of a single covalent bond to the forces exerted by cells in the micronewton range. The pendulum geometry prevents the snap-to-contact problem afflicting soft cantilevers in AFMs which enable attonewton force sensitivity. However, the microscopic length scale studies of cellular/subcellular forces parallel to the imaging plane of an optical microscope requires high sensitivity force measurements at high sampling frequencies despite the difficulties of implementing the pendulum geometry from constraints imposed by the focused incoming/outgoing light interfering with the sample surface. Additionally measurement systems for biological tissue samples in vitro must satisfy complex physical constraints to provide access to the vertical cantilever. Embodiments of the invention address these geometrical restrictions by exploiting optical periscope approaches that further allows multiple probes to be deployed and multiple optical beams within each probe.

20 Claims, 15 Drawing Sheets

METHOD AND APPARATUS FOR MEASURING CANTILEVER DEFLECTION IN CONSTRAINED SPACES

CROSS-REFERENCE TO RELATED APPLICATION

This patent application claims the benefit of U.S. Provisional Patent Application 61/329,182 filed Apr. 29, 2010 entitled "Method and Apparatus for Measuring the Deflection on Cantilevers in Constrained Spaces."

FIELD OF THE INVENTION

The invention relates to measurement equipment and more particularly to optical beam deflection apparatus.

BACKGROUND

Studies in the field of muscle Biophysics, Physiology, Nano-Scale Physics and Mechanics have been performed traditionally with preparations ranging from the whole muscle to isolated muscle cells. While these preparations allow measurements of force and muscle mechanics with high reproducibility, they do not allow the investigation of sub-cellular units—myofibrils, sarcomeres, molecules, etc. Recently, studies with myofibrils and sub-cellular units of muscles have emerged—but giving the complexity of the experiments involving these structures, only a few laboratories around the world have this capability.

Furthermore, the systems used so far with myofibrils have several limitations, including a low signal-to-noise ratio, which limits detection of small differences in force observed in different conditions, a very low time resolution which limits the detection of molecular and kinetics events that may happen at the microsecond scale, and the incapacity of measuring force and imaging the myofibrils simultaneously with high spatial and temporal resolution.

An ideal system should be able to provide measurements of minute force measurements in the attonewton (aN) to nanonewton (nN) range in myofibrils with microsecond scale temporal resolution, and high signal-to-noise ratio. From a biological perspective, measurements of molecular kinetics with unprecedented precision are highly desirable. For example, measurements of the kinetics of myofibrils and myofilaments composed of muscle molecules with the time resolution of microseconds should open new opportunities in the fields of physiology and biophysics.

At present the dominant microscope for such measurements and analysis is the Atomic Force Microscope (AFM) because the most evident advantage that atomic force microscopy boasts over all other microscopic and nanoscopic imaging methods is its unique ability to probe forces. A cantilever acts as the force transducer; its interaction with a sample causes a deflection which can be measured and calibrated into a force. The versatility of AFM is highlighted by the fact that the same instrument can be used for probing the piconewton forces of a single covalent bond for example through to studying the forces exerted by cells in the micronewton range.

However, all commercial AFMs are optimized for measuring forces which are perpendicular to the sample surface, which becomes a limitation when the forces of interest are parallel to the sample surface. This has led many researchers to design home-built systems to overcome this problem by the use of the pendulum geometry, wherein the cantilever is positioned with its long axis perpendicular to the sample surface, such that forces in-plane can be measured with high sensitivity. The pendulum geometry prevents the snap-to-contact problem that afflicts soft cantilevers in a regular AFM. Very soft cantilevers enable attonewton force sensitivity which is necessary, for example, in the detection of single spins in magnetic resonance force microscopy (MRFM). At the microscopic length scale, the studies of cellular or subcellular forces which are parallel to the imaging plane of an optical microscope place system performance requirements for high sensitivity force measurements at sampling frequencies beyond available video rates, requirements that can be met by optical measurement techniques.

However, the difficulty in implementing the pendulum geometry lies in the constraint imposed by the focused incoming light or the diverging outgoing light which easily interferes with the sample surface. Additionally in order to obtain the measurements of biological tissue samples in vitro the optical measurement system must satisfy complex physical constraints to provide access to the vertical cantilever and its holder with consideration of solution ingress/egress, temperature control, and pipette for stimulation of the biological sample. Accordingly it would be beneficial to provide an optical measurement system which overcomes these complex physical constraints. According to an embodiment of the invention the geometrical restriction is addressed by the exploitation of an optical periscope.

Beneficially such a system may be employed for many other biological and physical applications and far-reaching potential for studies using measurements of light displacement towards cantilevers in constrained spaces. It can be used to expand the capabilities of atomic force microscopy in all of its current fields of study, such as biophysics, biology, surface science, and the emerging field of magnetic resonance force microscopy (MRFM). Consequently it would be beneficial to provide a system and a method that resolves the aforementioned limitations which will enable the desired measurements.

SUMMARY OF THE INVENTION

In accordance with an aspect of the present invention there is provided a method comprising providing an optical beam component for receiving a first optical beam, directing the first optical beam to exit in a predetermined manner an optical window forming part of the optical beam component; receiving a second optical beam through the optical window; and coupling the second optical beam to an optical photodetector and providing a sample holder for attaching a sample to be characterized, the sample when attached being positioned in predetermined orientation to the optical window of the optical beam component. The method also comprising positioning the optical beam component with respect to the sample holder and determining a characteristic of the sample in dependence upon at least the second optical beam.

In accordance with an aspect of the present invention there is provided a method comprising providing an optical beam component for receiving a first optical beam from an optical train through a face of the optical beam component, directing the first optical beam to exit an optical window forming part of the optical beam component; receiving a second optical beam through the optical window; and coupling the second optical beam to the optical train through the face of the optical beam component, wherein the direction within the optical beam component between the face of the optical beam component and the optical window is through total internal reflection at exterior surfaces of the optical beam component and providing a positioning system for adjusting the position of the optical beam component with respect to a sample wherein the sample is mounted substantially parallel to the optical window. The method also comprising providing the optical train, the optical train receiving an optical signal, processing the optical signal to generate the first optical beam, receiving the second optical beam, processing the second optical beam to a third optical beam, and coupling the third optical beam to an optical photodetector.

In accordance with an aspect of the present invention there is provided a method comprising determining a characteristic of a sample mounted in a test holder comprising at least a cantilever by measuring the deflection of the cantilever perpendicular to the cantilever using an optical beam deflection component in conjunction with a sample manipulation component, an imaging component, and a microscope, and wherein the optical beam component receives a first optical beam from an optical train through a face of the optical beam component, directs the first optical beam to exit an optical window forming part of the optical beam component; receives a second optical beam through the optical window; and couples the second optical beam to the optical train through the face of the optical beam component and optical beam direction within the optical beam component between the face of the optical beam component and the optical window is through total internal reflection at exterior surfaces of the optical beam component.

BRIEF DESCRIPTION OF THE DRAWINGS

Embodiments of the present invention will now be described, by way of example only, with reference to the attached Figures, wherein.

DETAILED DESCRIPTION

Figure 1:
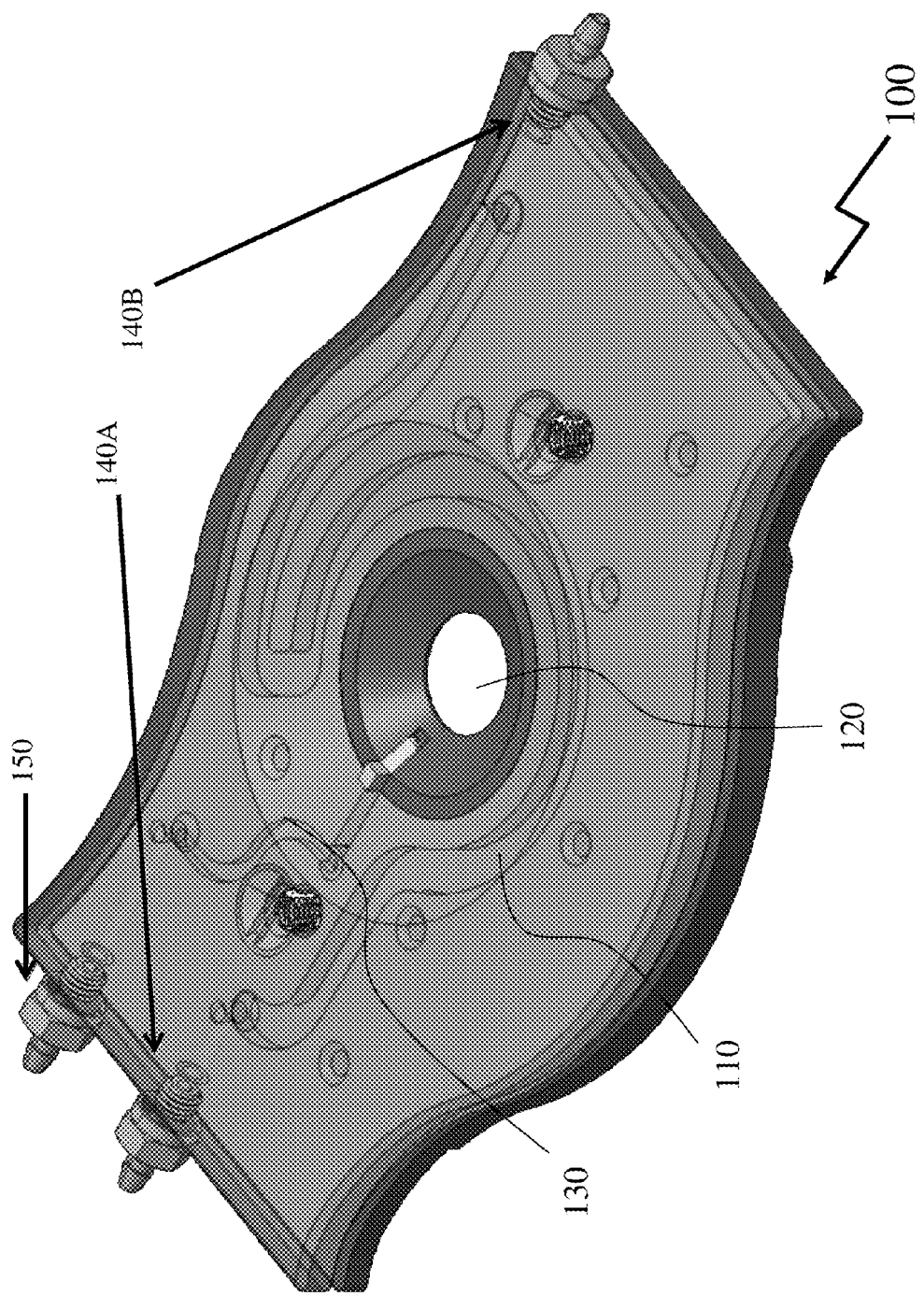
FIG. 1 depicts a three-dimensional schematic of an experimental sample environment according to an embodiment of the invention.

The following description is presented to enable a person skilled in the art to make and use the invention. Modifications to the disclosed embodiments will be apparent to those skilled in the art and the general principals described herein may be applied to any apparatus making use of the optical beam deflection method without departing from the scope of the invention. Therefore the present invention is not intended to be limited to the embodiments disclosed herein, but is to be accorded the widest scope.

The invention presented hereinafter consists of a method and apparatus for guiding the light towards the cantilever and measuring the resulting optical beam deflection (OBD), referred to as an optical periscope. It enables the optical beam to be guided onto cantilevers within a constrained space; for example, it the cantilever is perpendicular to a large planar surface, the apparatus allows focusing light onto the cantilever while avoiding obstruction by the planar surface, and couples the reflected optical beam back into the optical beam deflection component for measurement. Beneficially, apparatus minimizes the distance the light needs to travel in free space e.g., liquid or air, to attain the cantilever, thereby reducing potential disturbances which can cause substantial degradation of the signal. According to demonstrated embodiments of the invention the optical beam traverses only 600 micrometers in the liquid environment. The optical periscope is a custom machined optical component which allows the guiding of the laser light toward and away from the cantilever in constraining configurations. The optical beam is beneficially redirected away from the sample surface immediately after reflection from the cantilever because the optical beam spreads due to diffraction.

The apparatus can also be employed in an application where the re-direction of the optical beam in up to 3 dimensions is necessary, overcoming the difficulties commonly encountered in constrained space. It can also be used to simplify the optical setup necessary for the redirection of optical beam as multiple reflecting surfaces can be engineered into one optical component.

Key to the innovation is that the light enters a glass component through a polished surface which is durable and therefore can be easily cleaned, while all the reflections, used to guide the light into a constrained space or redirect the light to a optimum position and direction, are internal reflections with a protected reflective coating, such as a metal layer. The internal reflective surfaces are impervious to damage, if a protective layer is coated onto the reflective coating. Another advantage of this apparatus is that all the relative angles between any number of reflective layers can be optimized in the design process, and be implemented into a single optical component, and therefore any relative alignment between the surfaces is avoided during the usage of the device. This results in a very user-friendly device, which is well characterized.

The apparatus according to an embodiment of the invention can be divided effectively into two components:

(1) a cantilever/sample manipulation and imaging component, and (2) an optical beam deflection component.

The final apparatus according to embodiments of the invention integrates both components, which allows easy experimentation and efficient data acquisition for measuring cantilever deflections on the nanoscopic or microscopic scale. The separate components will be discussed in the following subsections. While the current apparatus focus on force detection, this is only a particular use of detecting cantilever deflection as would be understood by one skilled in the art. Detecting deflections in nanometer resolution has many applications but can be well understood in the following embodiment where the apparatus was calibrated to calculate forces in nanonewtons from the measured displacements in nanometres.

Cantilever/Sample Manipulation and Imaging Component: This component according to an embodiment of the invention is designed and developed to be used with any inverted microscope with or without fluorescence capabilities, including but not limited to confocal microscopes, two-photon microscopes, among other microscopy techniques. It would be evident to one skilled in the art that the component may be designed for use with other microscope configurations without departing from the scope of the invention. Individual sub-units of the component include those associated with environmental control of the sample environment and the translation stages for positioning of the vertical cantilever.

Laser sub-unit is used for measuring deflection of the cantilever. The laser, or other optical probe, is coupled onto the cantilever after passing through the optical beam deflection (OBD) component and is reflected back onto a photodetector, inserted into the OBD component. It would be evident that the laser, or other optical probe, may be selected according to a variety of factors, including but not limited to the biological sample and the time scale of biological characteristic.

Experimental Sample Environment: The experimental sample environment allows for temperature control, solution exchange, chemical stimulation in an arrangement especially designed for a vertical cantilever configuration. The experimental sample environment is the environment where the experiment takes place and is connected to a fluidic system and a variable speed pump. Typically measurements are required to be performed in a highly constrained space, a unique experimental sample environment is critical to accommodate all material needed for the experiments, as explained below. As such, the sample environment is not similar to any sample environment/chamber commercially available in the market. Referring to FIG. 1 there is depicted a three-dimensional design of the sample environment 100.

The sample environment 100 allows for temperature control during the experiments, through heat exchange between a first channel 110 surrounding the experimental chamber 120 and the inside solution in the chamber itself—the first channel 110 are continuously fed with solutions that will control the inner temperature, but which do not mix with the experimental environment which is defined by the experimental chamber 120. The experimental sample environment 100 also has a second channel 130 designed specifically for pumping solutions from the experimental chamber 120 into an external reservoir (or waste) (not shown for clarity), allowing for rigorous control of flow rate together with the perfusion system (as described below). First channel 110 couples to inlet 140A and first outlet 140B whereas second channel 120 couples to second outlet 150.

The experimental sample environment 100 fits the stage of an inverted microscope, and has space for rigid glass needles and cantilevers used for sample manipulation and data collection. It also allows the use of single and multi-barrelled pipettes, in conjunction with a perfusion system for allowing exchanged of solutions surrounding the samples, e.g. solutions with different concentrations of ions, pH, temperature, chemicals, etc. The design has enough space for manipulating samples so to align the cantilever with the OBD probe, and sample positioning by the doubled barrelled pipette.

Micromanipulators with six degrees of freedom (X, Y, Z, roll, pitch and yaw) are typically used to manipulate the glass needles and/or the cantilever within the experimental chamber 120. The micromanipulators are connected to a ceramic radial piezoelectric tube at one end, and to a holder that is used for positioning the cantilever. The needles and/or cantilever can be moved three-dimensionally with a space resolution of a few microns. The piezoelectric tubes having the characteristics of outside diameter 0.250"±0.003", wall thickness 0.020"±0.0015", and length 0.750"±0.005". The tubes are wired with nickel electrodes with four 90° quadrants, so that they change configuration responding to voltage changes, allowing lateral movements of the needle for example, thereby changing the length of the sample as required. It would be evident to one skilled in the art that alternative designs of needles and/or cantilever may be employed according to the constraints of the physical space, specimen etc for example. Similarly, piezoelectric tubes may be replaced or augmented with micromanipulators. Such micromanipulators where equipped with piezoelectric stages themselves may provide control to nanometre resolution.

The perfusion sub-unit is composed of different pieces that work together to allow controlled flow of varying solutions in pre-determined rates. It is composed of six reservoirs connected to channels, made of silicon tubing in this example, that are controlled by independent electro-mechanical valves. The valves are computer-controlled, and can be opened or closed independently in pre-specified times during the experiments. The reservoirs can be filled with different solutions and/or chemicals for example drugs, pharmaceutical compounds, etc. Selection of the channels providing the solution during the experiments is done by opening and/or closing the channels with the controlled valves. The channels are all coupled to a multiple-barrelled pipette, with two or more channels, which in turn is connected to a stepper motor driven positioning stage that controls the position of the multi-barrelled pipette with fine adjustment. The stepper motor step is used for pipette positioning, for precise delivery and dosing of activation and relaxation agents, wherein the position of the pipette can be moved rapidly (typically a few millisecond) to change the flow that is directed towards the sample(s). Such a method allows a rapid switch of the solutions for measurements of rapid molecular kinetics.

In this particular case, the pipette delivers laminar flow of two solutions continuously, e.g. two types of chemical agents, solutions with and without a specific drug, relaxing and activating solutions for muscle experiments, etc. It would be evident that alternatively a single barrelled pipette may be employed according to the requirements of the experiments being performed.

Imaging of the myofibrils or sarcomeres, or other biological specimens, is performed typically using two instruments simultaneously: (i) a linear array CCD camera or a fast CCD camera (µs/ms time-resolution), and (ii) a CCD camera for sample visualization and video recording. An important issue solved by embodiments of the invention in such apparatus is that the configuration allows imaging of samples that are very close to the cover slip, typically within 100 µm, which is a highly constrained environment. However, embodiments of the design also allow for measurements and imaging of samples placed further from the surface to be made according to the specific requirements of the tests being performed.

Cantilevers with any stiffness can be used in the system for measuring displacements. Such cantilevers are used frequently in studies using atomic force microscopy with high resolution and published repeatability. The cantilevers in the current system were attached using adhesives to a spatula that was attached to a holder mounted onto and controlled by one of the micromanipulators. It would be evident to one skilled in the art that other methods of attaching the cantilever may be employed without departing from the scope of the invention.

Figure 2A:
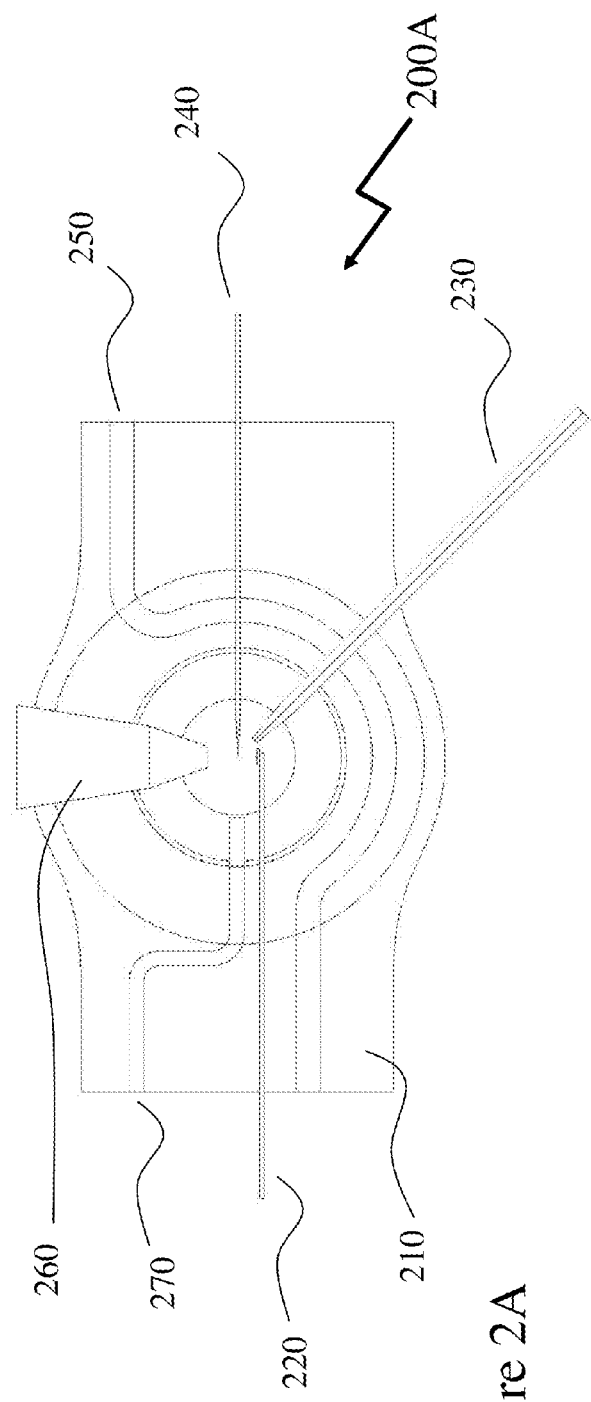
FIG. 2A depicts a top view of the of experimental sample environment with the glass needle, cantilever holders and optical periscope according to an embodiment of the invention.
Figure 2C:
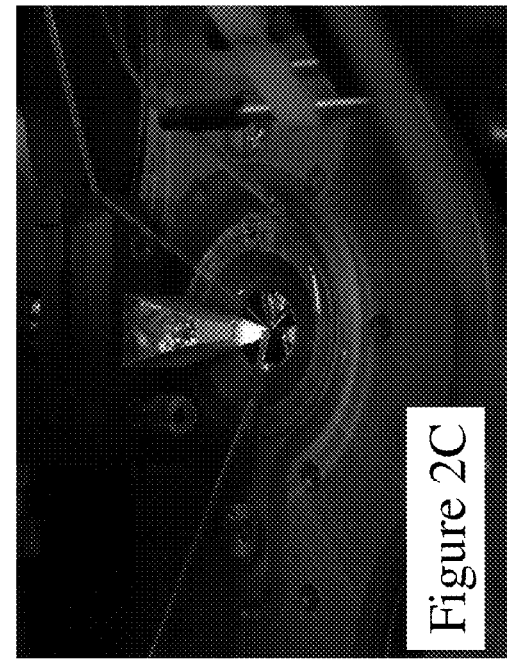
FIG. 2C shows an optical micrograph of the experimental sample environment according to an embodiment of the invention taken from the system on the stage of an inverted optical microscope.
Figure 2B:
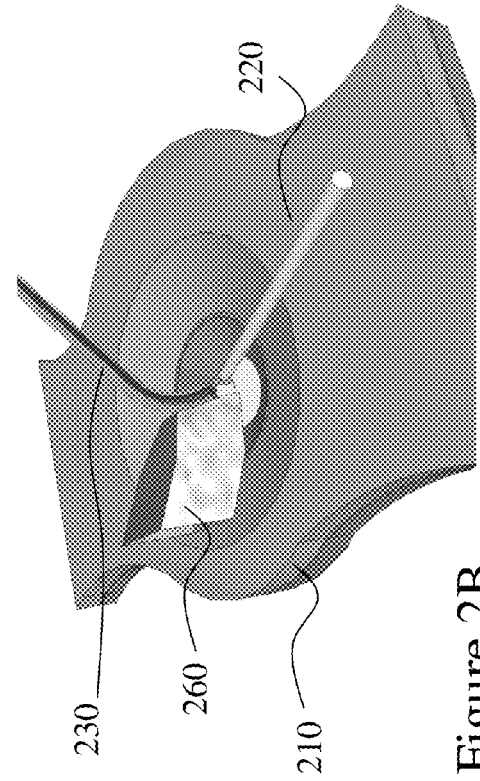
FIG. 2B shows a corresponding three-dimensional schematic of the experimental sample environment according to an embodiment of the invention.

Referring to FIG. 2A there is depicted a top view of the of experimental sample environment 210 together with the glass needle 240, cantilever holder 220, multi-barreled pipette 230, and optical periscope 260 according to an embodiment of the invention. Also shown are the solution channel 270 for pumping solutions from the experimental sample environment 210 and the temperature control channel 250. Referring to FIG. 2B there is shown a corresponding three-dimensional schematic of the experimental sample environment 210 according to an embodiment of the invention with the cantilever holder 220, multi-barreled pipette 230, and optical periscope 260. Now referring to FIG. 2C there is shown an optical micrograph of the experimental sample environment according to an embodiment of the invention taken from the system on the stage of an inverted optical microscope.

During a typical experiment, physical variations in the sample under test result in deflection of the cantilever e.g. a molecular assembly that shrinks upon changes in temperature, a DNA strand that unfolds, a muscle myofibril that contracts upon activation, etc., can be evaluated for several parameters. After a stiffness calibration of the cantilever, its deflection can also be converted into a measured force. The displacement is measured by the OBD component which measures the cantilever deflection and processes the signal, which is recorded during data acquisition, as described in the following section, thereby allowing derivation of the force exerted by the specimen against the cantilever.

In experiments by the inventors to demonstrate the effectiveness of the invention, the OBD component was used to measure the force developed by an activated myofibril or muscle filament over time, with microsecond time resolution, however, it would be evident that the time constant of embodiments of the invention may be established over a wide range in dependence upon factors including, but not limited to, the cantilever, optical photodetector, processing electronics post-photodetector, and optical beam. An objective for the OBD component being to measure the cantilever displacement as a result of any force. When a force is applied by the contracting myofibril, the cantilever is bent and the displacement is measured by tracking the displacement of the laser beam position on a photodetector. The functioning principle is the following: the sample is held by a stiff micro-needle at one end and a cantilever at the other end.

A laser beam is focused on the surface of the cantilever and reflected onto a multi-element photodetector. The output signal of the multi-element detector varies depending on the position of the reflected beam on the multi-element detector. A very small displacement of the cantilever translates into a displacement of the reflected beam on the multi-element detector, which can be recorded.

Amongst the experiments to test the OBD component and overall system was one performed with a myofibril isolated from the rabbit psoas muscle, following an established protocol. The myofibril was suspended between an atomic force cantilever, ATEC-CONTPt Nanosensors™ with nominal stiffness 0.2 N/m, and a rigid glass needle, both connected to three-dimensional micromanipulators. The temperature of the solution surrounding the myofibrils was controlled and maintained constant at 15° C. The myofibril was initially immersed in a bath containing a resting solution with low $Ca^{2+}$ concentration ($pCa^{2+}$=9.0) and the sarcomere length and myofibril diameter were measured under 90× magnification using a charge-coupled device (CCD) camera. Activation of the myofibril was achieved by quickly exchanging, <10 ms, the solution surrounding the myofibril using a double barrelled pipette, attached to a multichannel perfusion system. When the myofibril is surrounded by an activating solution with high $Ca^{2+}$ concentration ($pCa^{2+}$=4.5), it contracts and exerts a force on the cantilever, measured by the OBD component.

Figure 3:
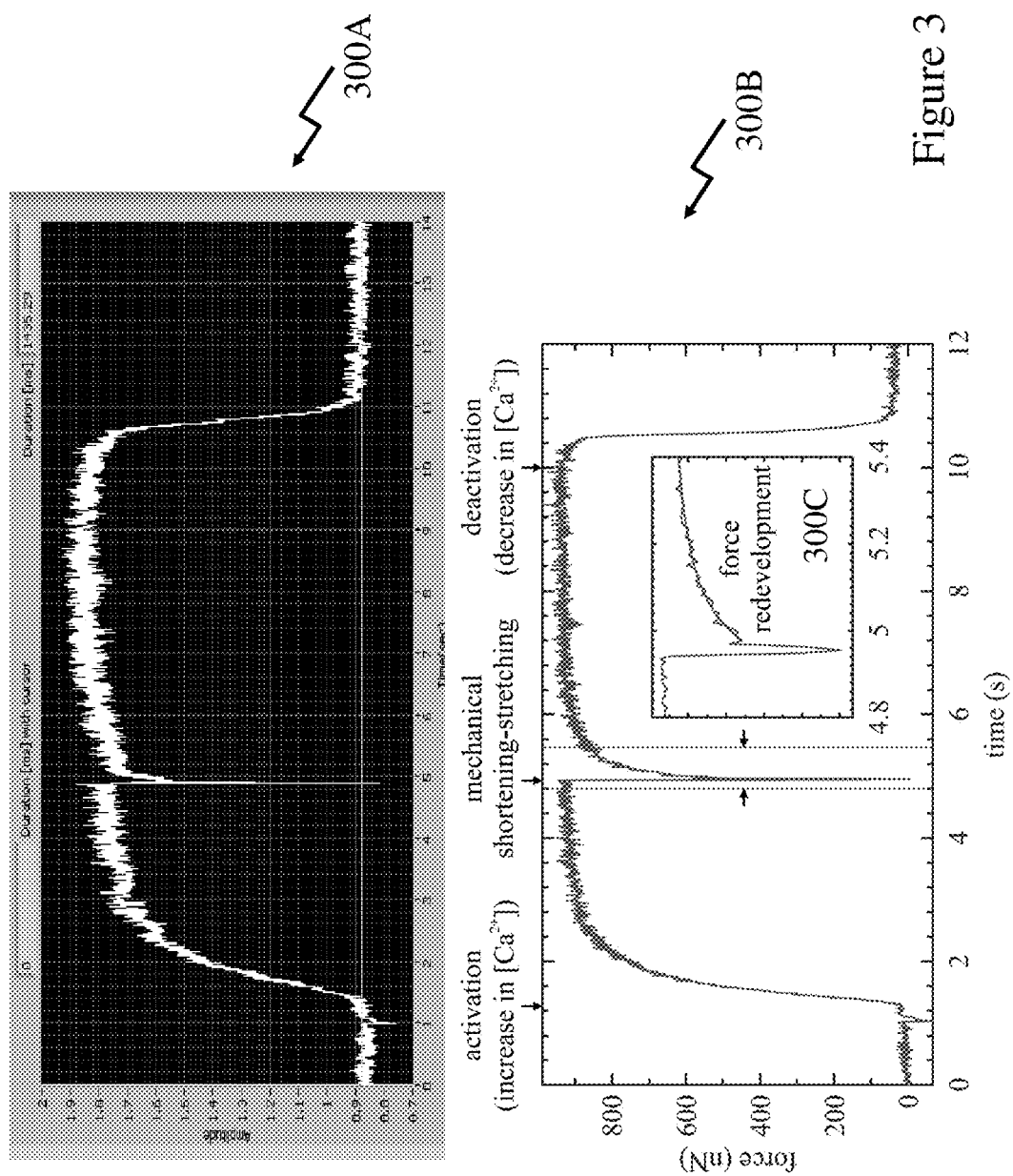
FIG. 3 shows a screen capture of the cantilever displacement measured with a system according to an embodiment of the invention.

Furthermore, since the glass needle is connected to a computer controlled motor arm, changes in myofibril length can be made rapidly allowing for an accurate biomechanical characterization. The apparatus has recorded cantilever displacements caused by contraction produced at a sarcomere length of 2.4 µm, as depicted in FIG. 3 wherein the as-measured displacement is presented as first trace 300A. Upon activation, the force increased rapidly to achieve a steady-state level. The force and the rate of force development ($K_{ACT}$) upon activation produced by this myofibril before shortening-stretching is comparable to the levels observed previously in other laboratories, see for example Telley et al in "Half-Sarcomere Dynamics in Myofibrils during Activation and Relaxation Studied by Tracking Fluorescent Markers" (Biophys J. 90, pp 514-530, 2006) and Piroddi et al in "Contractile Effects of the Exchange of Cardiac Troponin for Fast Skeletal Troponin in Rabbit Psoas Single Myofibrils" (J. Physiol. 552, pp 917-931, 2003).

When the myofibril is rapidly shortened and re-stretched to the initial length, there is rapid force redevelopment. The rate of force redevelopment ($K_{TR}$) is commonly used for probing the mechanisms of interaction between myosin and actin, the two major contractile proteins present in striated muscles. The relaxation phase upon myofibril deactivation can be fitted with a linear function ($K_{LIN}$) and an exponential function ($K_{REL}$) associated with the detachment of myosin-actin interactions and consequently sarcomere relaxation.

Given the characteristics of force production for activation and relaxation of these myofibrils, it is apparent that the OBD component adequately adapts the pendulum geometry such that forces can be measured parallel to the plane of the sample. The derived force from the sarcomere length of 2.4 µm is shown in second trace 300B of FIG. 3 together with markers identifying changes to the experimental environment. The displacement to force calculation being according to the formula in Equation (1) below.

$$F = K \cdot \Delta d \quad (1)$$

where F is the force, K is the stiffness of the cantilever, and $\Delta d$ is the displacement of the cantilever. It is evident from second trace 300B and insert 300C that high temporal resolution of physiological changes can be detected, in this instance the response to increase calcium in the in vitro environment. It would be evident to one skilled in the art that the configuration of the OBD component provides also for high spatial resolution so that the muscular response could be measured at multiple points spatially on the muscle to look for variations in either temporal or spatial response.

Optical Beam Deflection (OBD) Component: The purpose of the OBD component is the detection of the cantilever bending, with the potential for applications requiring high spatial and/or temporal resolution, and to perform this detection in constrained spatial environments with non-horizontally disposed cantilevers. The OBD method is where a light beam, e.g. a monochromatic laser, tunable light source, or other optical source, is focused onto a cantilever whose deflection is being measured such that the deflection is converted to an angular displacement that is then measured. The conventional experimental setup has the cantilever nearly parallel to the surface that is under study. However, some applications require a cantilever that is perpendicular to the surface, or at non-horizontal angles, making the OBD method problematic because the surface interferes with the light beam focused onto the cantilever. The OBD method will be briefly explained in this section, followed by a description of the novel method and optical component used to overcome the problems encountered when implementing the OBD method on systems with constrained spaces.

Figure 4:
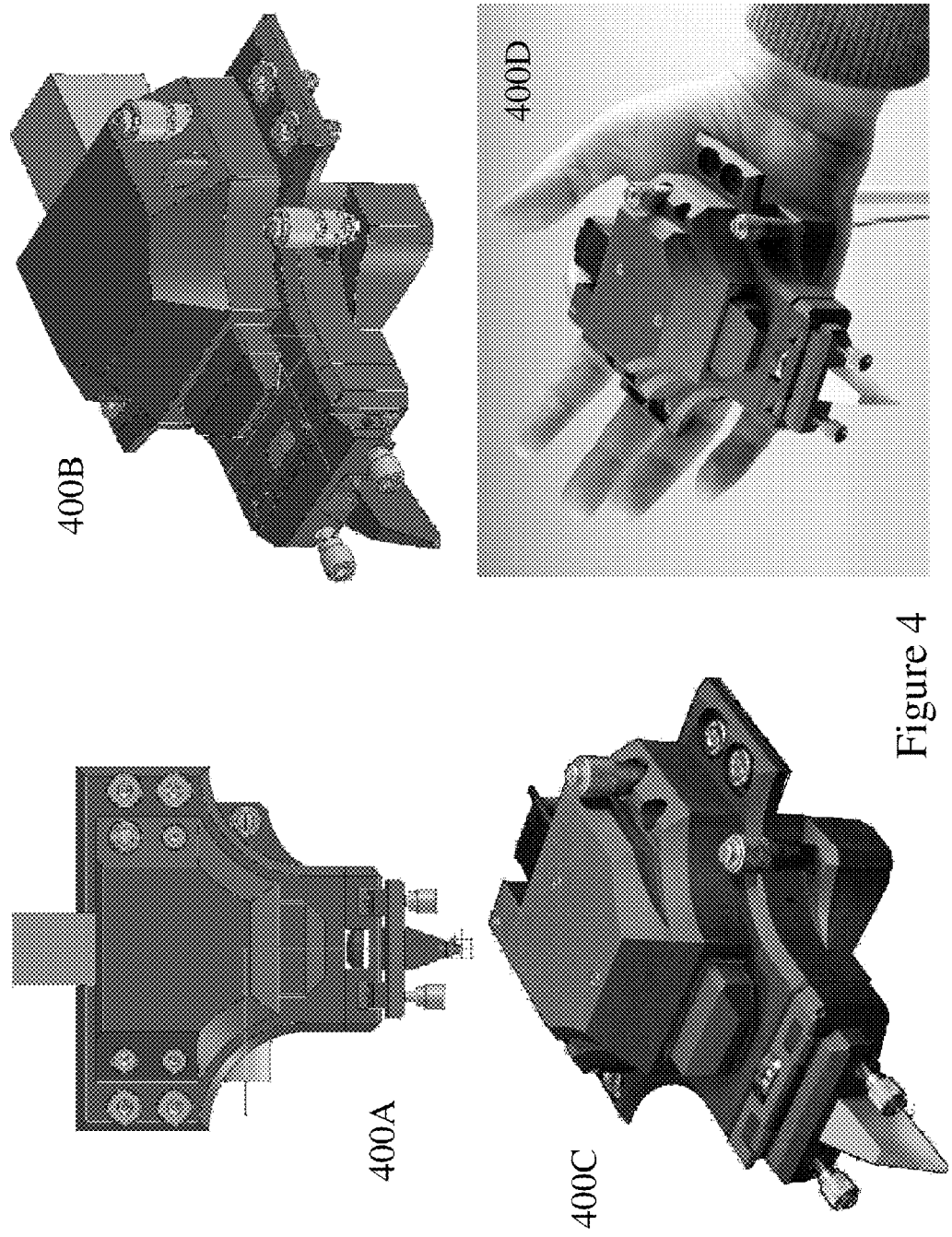
FIG. 4 shows various images of the optical beam deflection component according to an embodiment of the invention.
Figure 5:
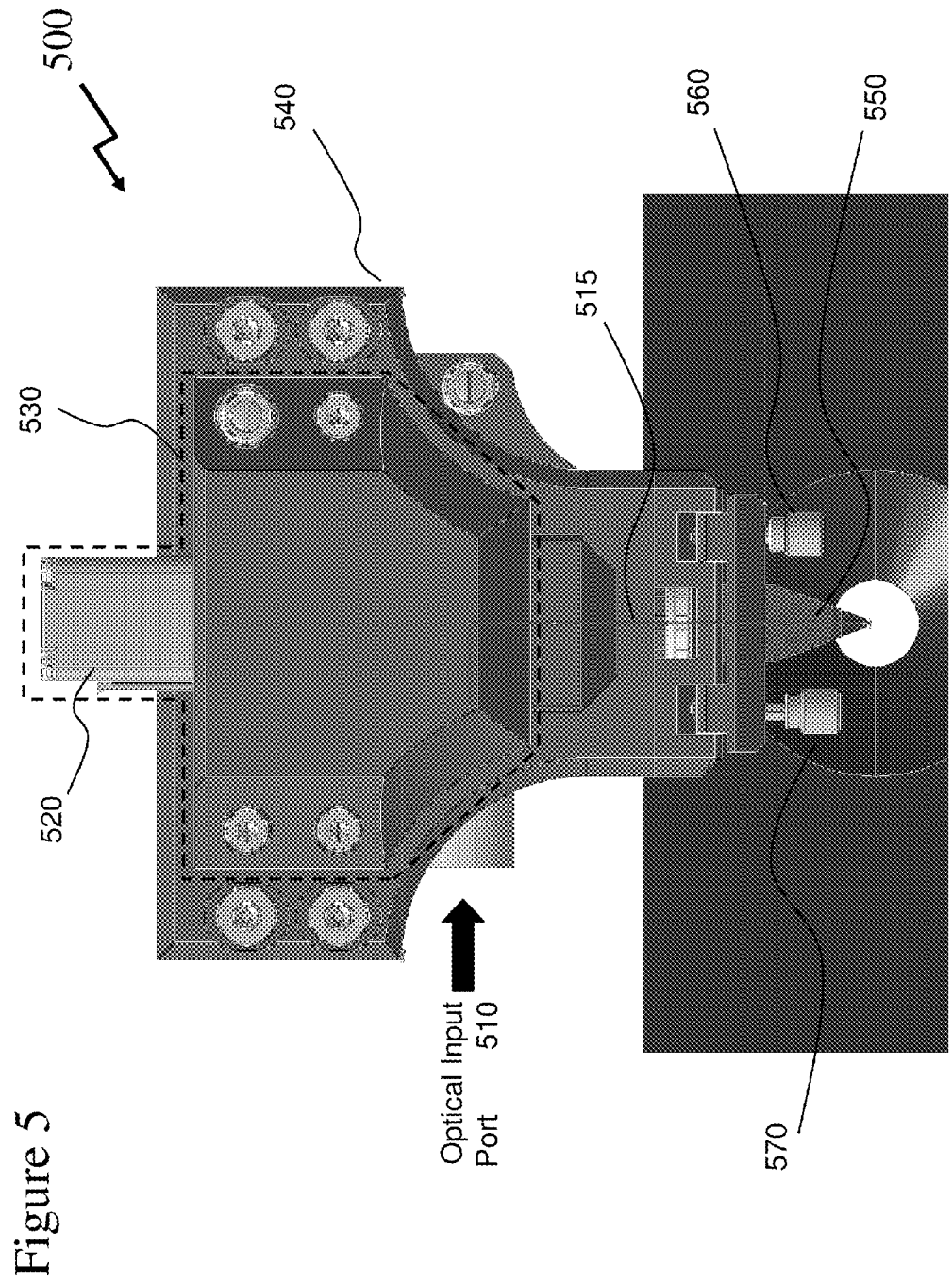
FIG. 5 depicts a schematic of the optical beam deflection component in combination with the experimental sample environment according to an embodiment of the invention.

Referring to FIG. 4 there are shown engineering schematics 400A through 400C of the OBD component according to an embodiment of this invention, together with an optical micrograph of the actual OBD assembly 400D. Referring to FIG. 5 elements of the OBD component 500 are depicted beginning with optical input port 510 that couples to the internal optical sub-assembly, not identified, following optical path 515 to the optical periscope 550 wherein the reflected beam is coupled back through the optical sub-assembly to the optical photodetector and translation stage sub-assembly 530 wherein the position of the optical photodetector is adjustable through controller 520. Disposed on the front of the OBD component 500 are first and second micrometer screws 560 and 570 allowing the position of the optical periscope to be adjusted relative to the main body of the OBD component 500.

Figure 6:
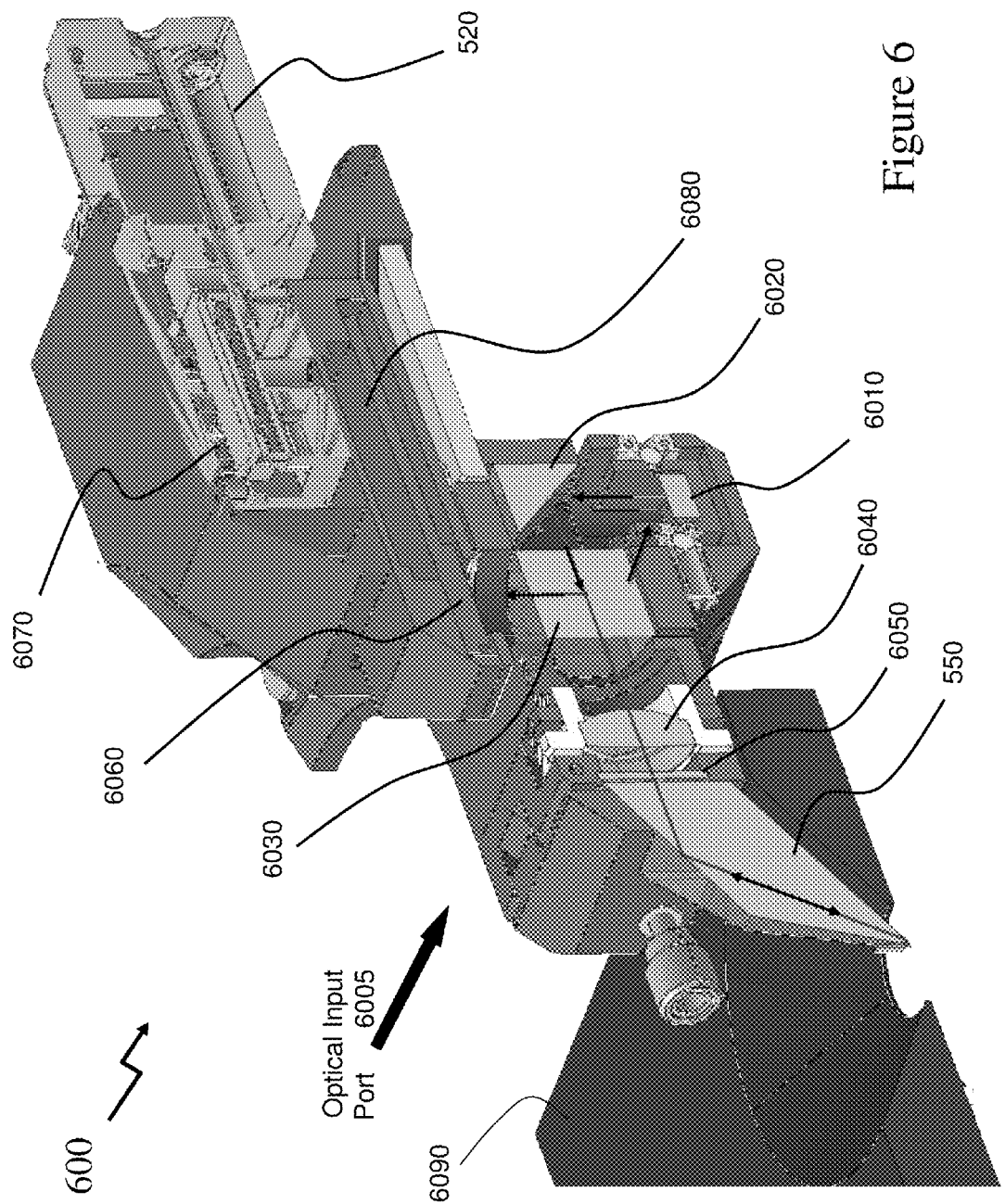
FIG. 6 depicts a schematic of the optical path in the optical beam deflection component according to an embodiment of the invention.

Referring to FIG. 6 there is depicted a three-dimensional cross-section of the OBD component 600. As shown the optical input beam 5005 enters the OBD component 600 through the optical port, not visible in this cross-section, and impinges on first right angle prism 6010 wherein the beam is coupled vertically to second right angle prism 6020 and then to polarizing beam-splitter 6030, focussing lens assembly 6040, quarter-wave plate 6050 and then into the optical periscope 550 which is positioned within the experimental sample station 6090 relative to the cantilever, not shown for clarity. The optical signal is reflected from the sample on the cantilever, propagated through the optical periscope 550 and back through the quarter-wave plate 6050 and focussing lens assembly to polarising beam-splitter 6030 wherein it is coupled vertically to the optical photodetector 6060 which is mounted on the detector circuit card 6080. The optical photodetector 6060 being positioned relative to the polarizing beam-splitter 6030 through motorised position stage 6070 that is controlled through controller 520. It would be evident to one skilled in the art that controller 520 may be a stepper motor controller, piezoelectric controller, manual controller or a combination thereof.

As such within the OBD component 600 the incoming collimated optical beam is reflected off two mirrors, first and second right angle mirrors 6010 and 6020, deviated by 90° upon each reflection. Each mirror is mounted on a rotational stage, which allows the adjustment of the optical beam orientation with 2 degrees of freedom (angular). This adjustment allows the positioning of the focused laser spot onto a chosen position in the cantilever. The laser then crosses a polarizing beam splitter 6030, such that the outgoing optical beam is p-polarized for example. The optical beam is focused by a focusing lens assembly 6040, which is mounted on a thread to allow the position of the focal plane onto the cantilever. The optical beam then crosses a quarter-wave plate 6050 that converts it to a circularly polarized optical beam. The optical beam then reflects off the cantilever; its path is deviated according to the cantilever deflection angle and it is converted to a clockwise-polarized optical beam by the quarter-wave plate 6050.

Upon transmission through the quarter-wave plate 6050, the optical beam becomes s-polarized and then is collimated by the focusing lens assembly 6040. Because the optical beam is s-polarized, it reflects off the polarizing beam splitter 6030 rather than travelling straight through, as p-polarized light would. The optical beam then impinges on the optical photodetector 6060, which is mounted directly on the translation stage 6070, which allows precise movements. Translation stage 6070 may be one, two or three dimensional. The OBD component 600 may itself be mounted onto a further positional stage in order to provide vertical movement of the OBD component 600 or larger travel in one, two, or three-dimensions according to the requirements of the system. Optionally, the spatial separation of the returned optical beam for coupling to the optical photodetector from the optical beam coupled to the component may be implemented by alternative techniques evident to one skilled in the art of optical system design.

Figure 7:
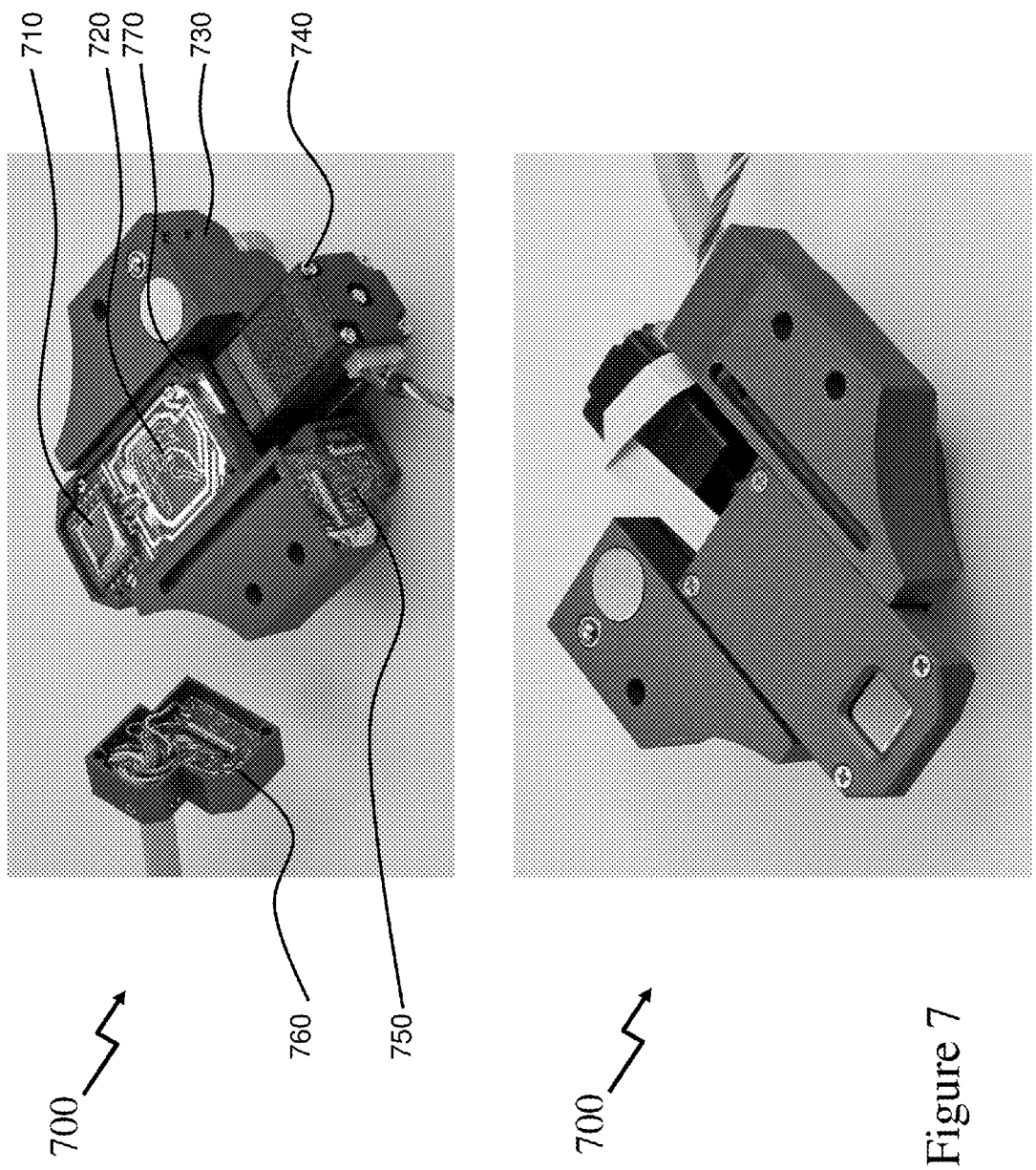
FIG. 7 depicts optical micrographs of an upper sub-assembly of the optical beam deflection component comprising the optical photodetector and motorized translation stage according to an embodiment of the invention.

Referring to FIG. 7 there are depicted optical micrographs of an upper sub-assembly 700 of the optical beam deflection component comprising the optical photodetector and motorized translation stage according to an embodiment of the invention, for example optical photodetector and translation stage sub-assembly 530 in FIG. 5 supra. The optical photodetector 710 has four (4) quadrants and is mounted on the OBD body 730 via circuit board 720 to a translation stage 770 that is driven by a linear motor 740 for fine adjustments of the quadrant positions. The output from the circuit board 720 is coupled to an interface board 750 within the OBD body 730. The output of the interface board is coupled via a cable to the measurement and analysis system operating in conjunction with the OBD component. As shown the cable interface 760 with cable is shown detached from the interface board 750. Optical photodetector 710 measures the amount of light incident on each of the four quadrants or these may be combined to provide top/bottom or left/right sections. Within an exemplary embodiment of the invention the difference between the top and bottom signals is a measure of the cantilever deflection wherein the cantilever provides single axis deflection. The motorised stage allows the optical photodetector 710 to be initially centered onto the collimated optical beam at the beginning of the experiment.

It would be evident to one skilled in the art that should a two-dimensional deflecting structure be provided instead of a one-dimensional cantilever then the approach is also applicable to measuring the resultant two-dimensional beam deflection through monitoring the four quadrants individually. Equally should the cantilever be rotated to be in the plane of the experimental stage but still be vertically disposed then the right/left signals of the photodetector may be employed. In applications where speed is not a primary importance the four quadrant photodetector may be replaced by a linear CCD array, for one-dimensional deflections, or a two-dimensional CCD array for both two-dimensional tracking and both modes of one-dimensional tracking. In this case the beam profile may be established over multiple pixels in the array and fitting software employed to establish the beam centre at each CCD array readout.

The unique implementation of this specific OBD component is the method of guiding the light towards the cantilever.

In the prior art, the cantilever is roughly parallel to the sample surface, and therefore there exist nearly no geometrical constraints for focusing the optical beam onto the cantilever and collecting the reflected light. A large range of incident angles onto the cantilever can be used, because there is free space above the cantilever. In the situation described previously, the cantilever long-axis is positioned perpendicular to the microscope slide, because motions parallel to the microscope slide are of the measure of interest. This arrangement causes difficulties in the focusing and collecting of the optical beam because the cantilever is as close as 10 microns away from the microscope slide. Because the optical beam has a divergence angle necessary to for it to be focused onto the cantilever, the optical beam will inevitably interfere with the surface within millimetres before or after reflection from the cantilever.

Figure 8A:
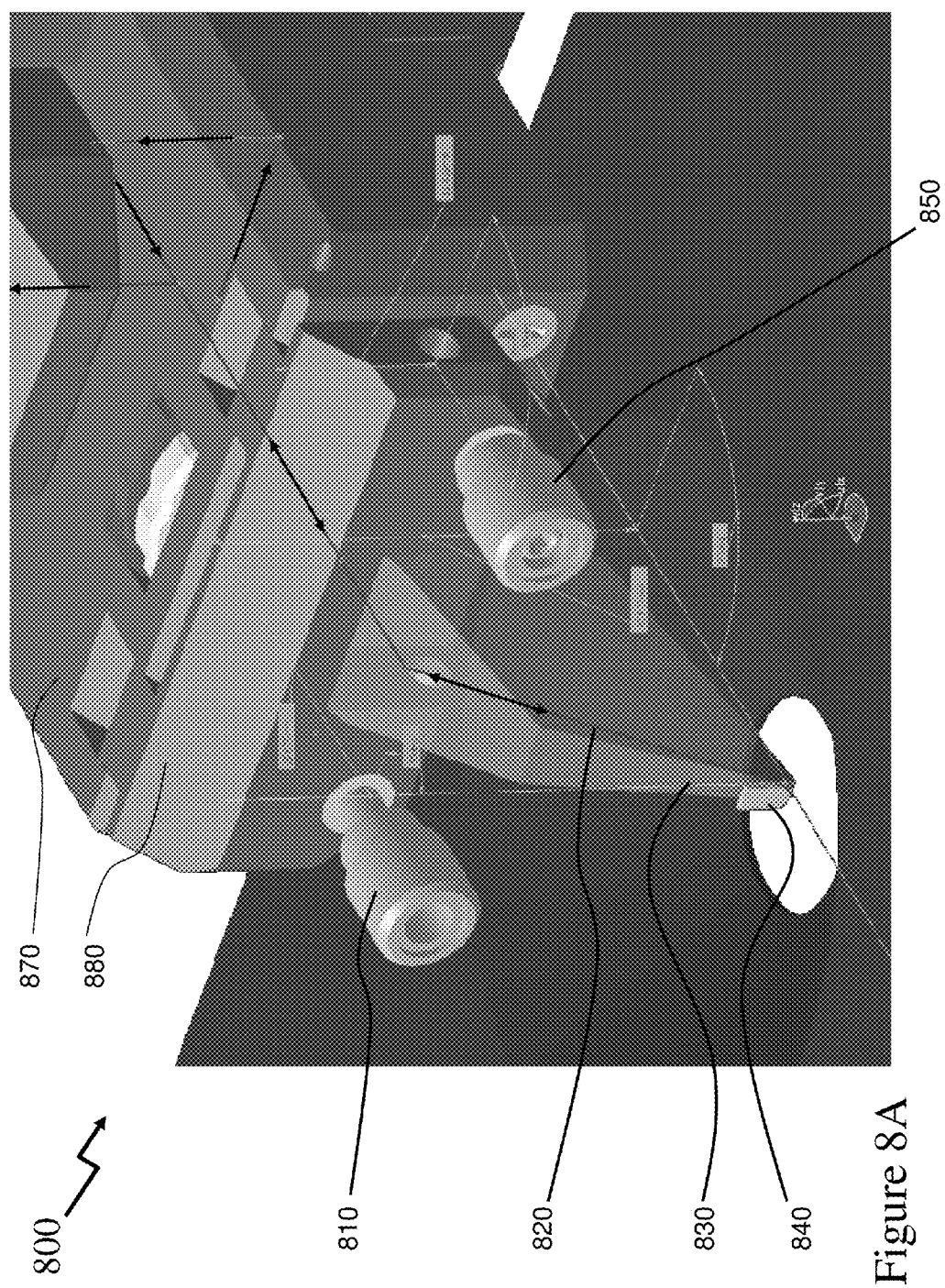
FIGS. 8A and 8B depict schematics of the optical periscope for the optical beam deflection component according to an embodiment of the invention.

Now referring to FIG. 8A there is depicted a schematics of the optical periscope 850 for the optical beam deflection component according to an embodiment of the invention. As shown the optical periscope 830 is mounted to a front assembly 860 that is mounted to the OBD component 870 together with first and second micrometers 810 and 850 respectively. The end-face of the optical periscope 830 being positioned with respect to the cantilever 840 and angularly adjusted through the combination of first and second micrometers 810 and 850 respectively. The path of the optical beam within the OBD component being depicted by light path 820.

Figure 8B:
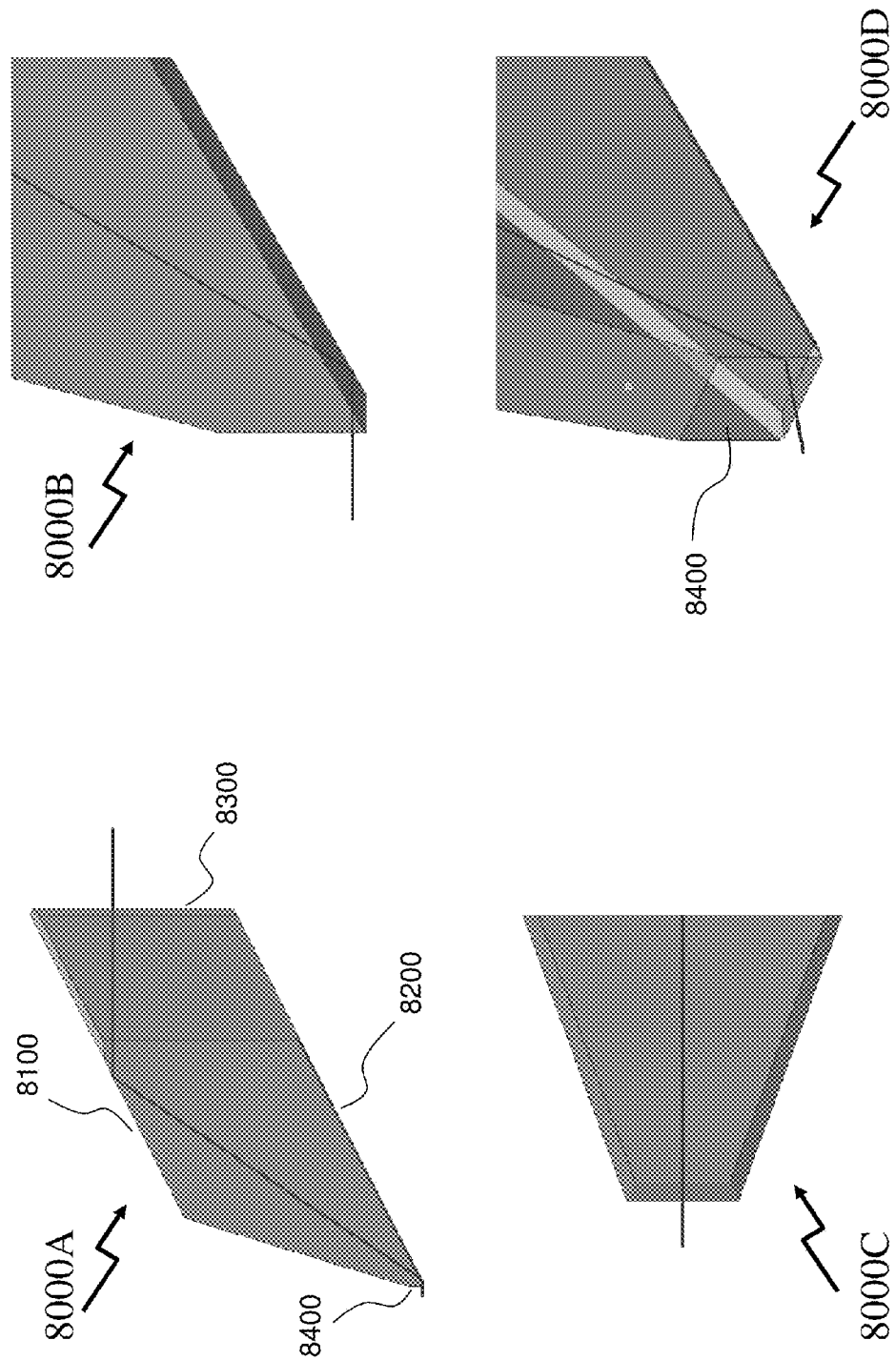

Now referring to FIG. 8B the optical component which allows such work in confined spaces to be performed, the optical periscope, is displayed from computer modelling in several views, namely side elevation 8000A, close-up side elevation 8000B, plan elevation 8000C and perspective view 8000D. The optical periscope, such as optical periscope 260 in FIGS. 2A/2B, optical periscope 550 in FIGS. 5/6 and optical periscope 850 in FIG. 8, is a single piece of optical quality glass which is custom machined for the specific application as depicted in these figures discussed supra. The optical periscope as visible external to the OBD component comprises four (4) surfaces which are optically polished for transmission and reflection of the light beam. As shown in side elevation 8000A two of these surfaces, being upper surface 8100 and lower surface 8200, were metalized for internal reflection. Optionally total internal reflection can also be used. Metallization provides for more reliable measurements in case of surface contamination with liquid(s) from the experimental stage during the positioning of the optical periscope relative to the cantilever prior to measurements being performed.

The optical beam enters the large aperture of the optical periscope at face 8300 and reflects of the metalized upper surface 8100, which directs it downwards. The optical beam is undergoing focusing as it travels, and reaches a very small beam diameter when reflected from the metallized lower surface 8200. This reflection occurs very close to the ground edge of the periscope, and therefore the periscope was manufactured with an edge in that location (finely ground). After this second reflection, the light beam exits the small aperture on measuring face 8400, shown in more detail in perspective view 800D. The focal plane of the optical beam is set in front of the measuring face 8400 by design of the optical periscope in combination with the focussing lens assembly within the OBD component and can be established as several microns to several hundred microns past the plane of the measuring face 8400. Within the OBD components presented supra this location is tuneable by moving the focusing lens assembly, allowing for fine, precise adjustments.

Figure 9A:
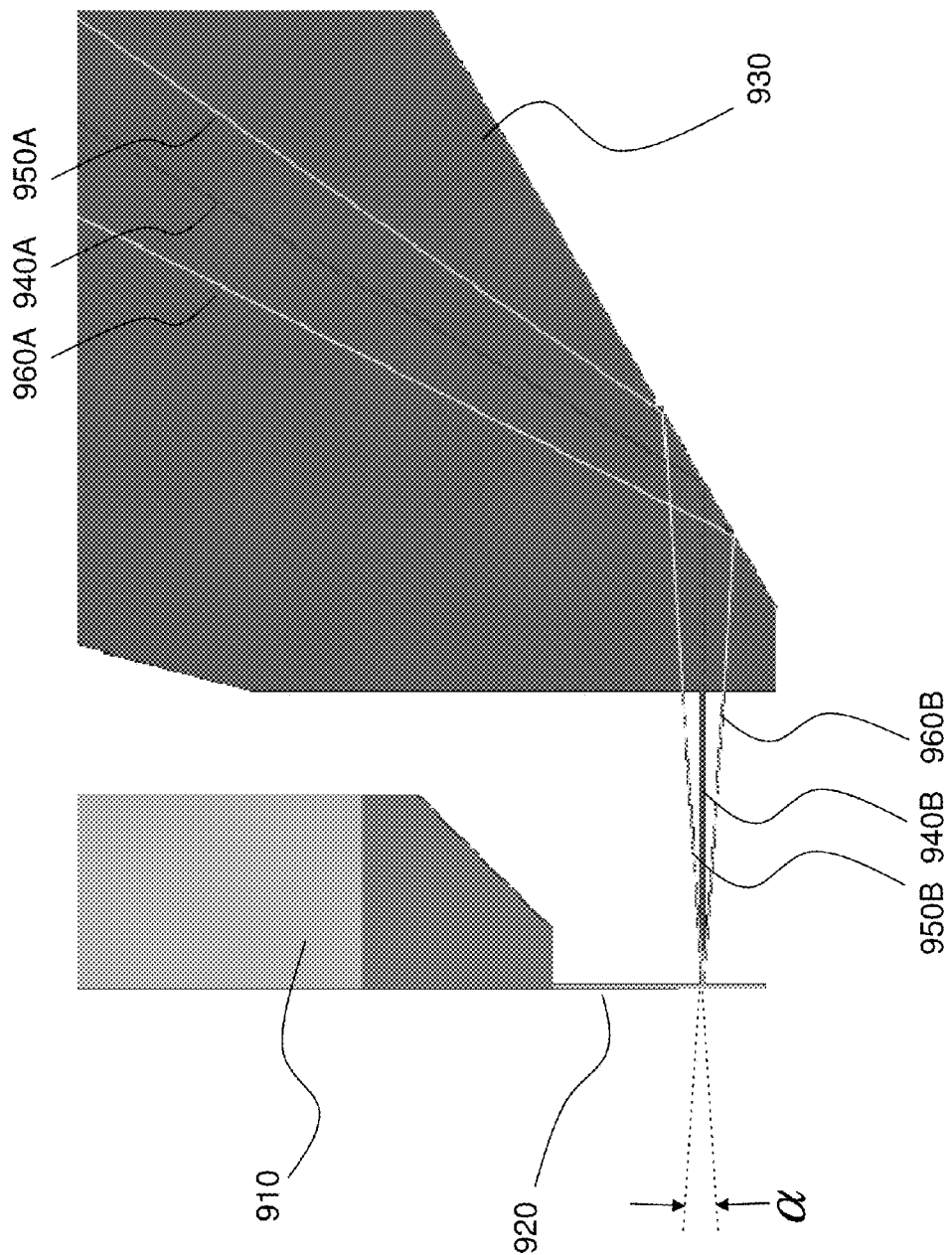
FIGS. 9A and 9B depict schematics of the optical pathway within the optical periscope of the optical beam deflection component according to an embodiment of the invention.
Figure 9B:
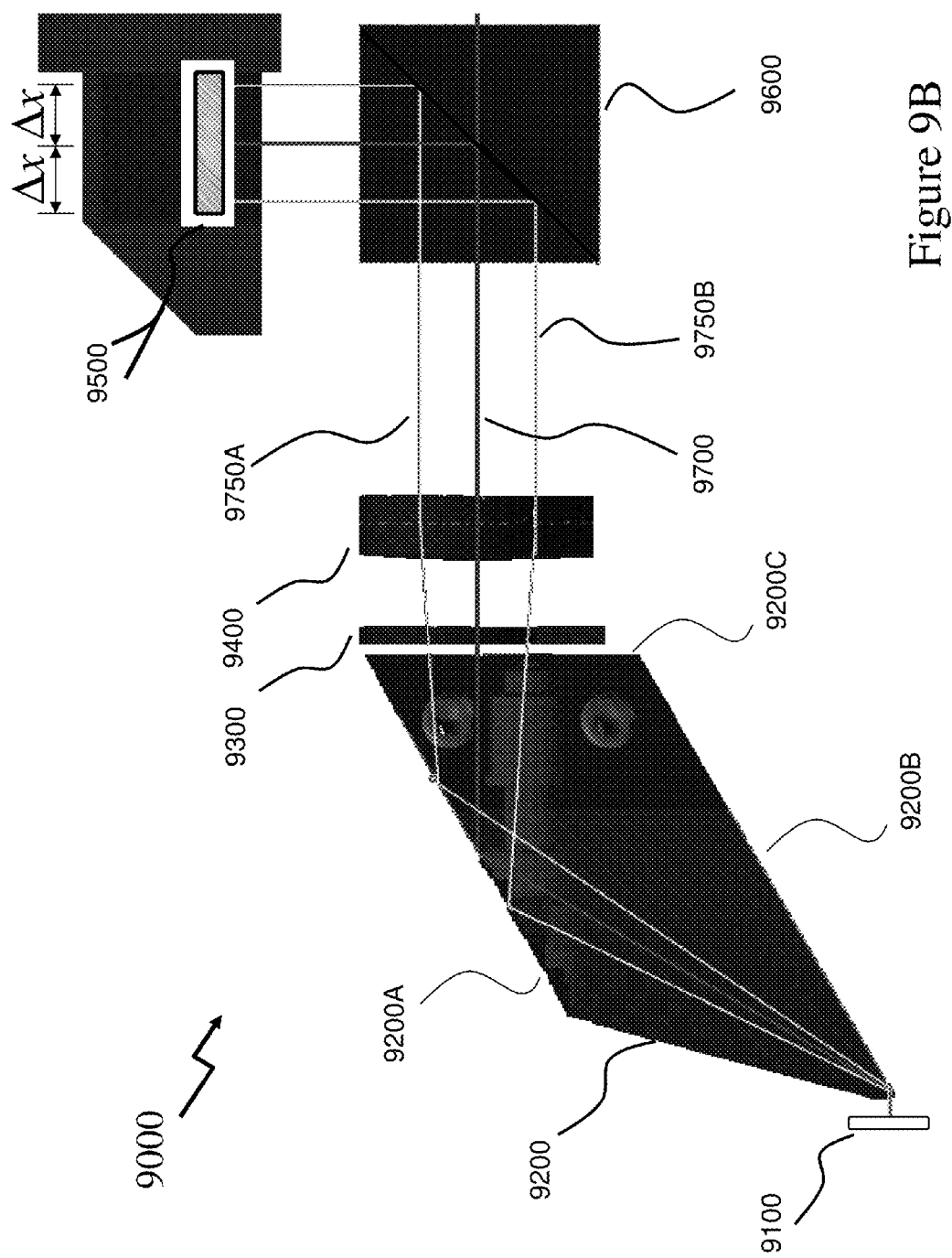

Referring to FIGS. 9A and 9B there are depicted schematics of the optical pathway within the optical periscope of the optical beam deflection component according to an embodiment of the invention. Referring to FIG. 9A a side elevation is depicted showing cantilever mount 910, cantilever 920 and optical periscope 930. Also shown are optical beam sections 940A and 940B inside and outside the optical periscope respectively for the OBD measurement system under the initial starting conditions, or at a measurement point where the beam deflection is zero. Accordingly a first deflection of $\alpha/2$ results in first reflected optical path 950B which becomes first reflected optical path 950A inside the optical periscope whilst an equal and opposite second deflection of $-\alpha/2$ results in second reflected optical path 960B which becomes second reflected optical path 960A inside the optical periscope.

If $\pm\alpha/2$ represents the displacements of the cantilever when the optical beam has traversed to be completely in the top and bottom sections of the optical photodetector then these represent the maximum displacements measurable with a two-section or four-quadrant detector arrangement representing a total angular beam displacement of $\alpha$ and thus displacement range of the cantilever. Alternatively by exploiting modifications to the optical path, for example reduced collimated optical beam diameter, large one-dimensional CCD arrays, two-dimensional CCD arrays as well as the configuration of the optical path may increase the range of displacement and/or resolution of displacement measurable.

Now referring to FIG. 9B a side assembly view 9000 is depicted showing cantilever 9100, optical periscope 9200 and other elements of the optical train from optical periscope 9200 to optical photodetector 9500 within the OBD component, not shown for clarity. Accordingly there are shown three optical beam paths 9700, 9750A and 9750B. First optical beam path 9700 representing the path of the optical beam probe as it is coupled through the optical assembly to the cantilever 9100 and reflected back when there is no deflection on the cantilever 9100. Second and third optical beam paths 9750A and 9750B respectively represent the paths extended throughout the OBD component and optical train as described by second and first reflected optical path 960A and 950A respectively in FIG. 9A.

These first to third optical beam paths 9700, 9750A, and 9750B then propagate from the lower surface 9200B to the upper surface 9200A wherein they are reflected and propagated through the rare facet 9200C of the optical periscope 9200 wherein they propagate to the quarter-wave plate 9300 and focusing lens assembly 9400 and then to the polarizing beam-splitter 9600. Accordingly, they are then reflected up towards the optical photodetector 9500. As with FIG. 9A if second optical beam path 9750A represents maximum deflection of the cantilever by $\alpha/2$ then the optical beam has moved $\Delta x$ in one direction on the optical photodetector 9500 and third optical beam path 9750B represents maximum deflection of the cantilever in the opposite direction of $-\alpha/2$ then the optical beam has moved $\Delta x$ in the other direction on the optical photodetector 9500. As noted previously if the cantilever 9100 supported deflection in two dimensions, i.e. in the plane of the drawing and out of plane of the drawing then the optical beam on the photodetector would likewise move in the plane of the drawing and out of the plane of the drawing wherein a quadrant photodetector or 2D CCD would allow readout of the resulting beam deflections in x and y directions.

The cantilever 9100 is located near the focal plane of the focusing lens assembly 9400, and reflects the focused light beam The optical periscope 9200 allows focusing of light parallel to the microscope slide at a distance of around a few microns to millimeters. It does so by delivering the light and collecting it over very short distances, such that the expanding beam does not interact with the microscope slide surface; rather, it expands once it is travelling within the periscope. The key feature therefore is to use internal reflections to deviate light from the surface; allowing the manufacturing of optical components with well-defined edges at obtuse angles, rather than acute angles which are prone to chipping. Another advantage of this design is that the metalized surface is internal, and therefore is not soiled by contaminants (e.g. chemicals). In addition, it is not damaged during cleaning—only the apertures need to be cleaned, which are made of hard glass.

In this particular embodiment of the periscope, the four (4) optical faces form a parallelogram, as seen from FIG. 8. In this case, the angle of beam at the large aperture and small aperture are equal. However, the angle of all four (4) faces can be tailored to the specific application to optimize the path trajectory for any case. In addition, the optical path need not be constrained to a single plane, as it has been in the descriptions with respect to FIGS. 6, 8A, 9A and 9B supra, a different optical periscope design could deviate light in multiple directions to accommodate the geometry of any particular instrument.

Additionally this component can also be used for creating compact optical systems where multiple optical paths can be handled with multiple optical components or a single optical component. For example, certain types of atomic force microscopes or variations thereof require multiple probes, or cantilevers, to be manipulated and detected simultaneously with all the probe tips in proximity down to the micron range.

In such a system, it is highly desirable that each probe unit comprising of a probe, optical beam and photodetector is independent from the others. That is, each probe unit can be moved up to the sample independently from all its neighbours. However, because each probe needs clearance from the sample, with a typical range of 5 to 20 degrees, it is inevitable that light paths reflected off the cantilever backside cross each other. Certain systems have solved this problem by constructing special cantilevers that are bent in such a way that the optical beam returns towards the probe unit (see for example www.multiprobe.com), rather than crossing over the sample as is inevitably the case for flat cantilevers that are tilted for clearance.

This results in large cantilevers which have poor mechanical properties for imaging. As such, these systems have resolutions which are far from the atomic scale, as well as reduced imaging speeds. Adding atomic resolution capability to multiprobe systems with a large number of independent probes would be beneficial.

Figure 10:
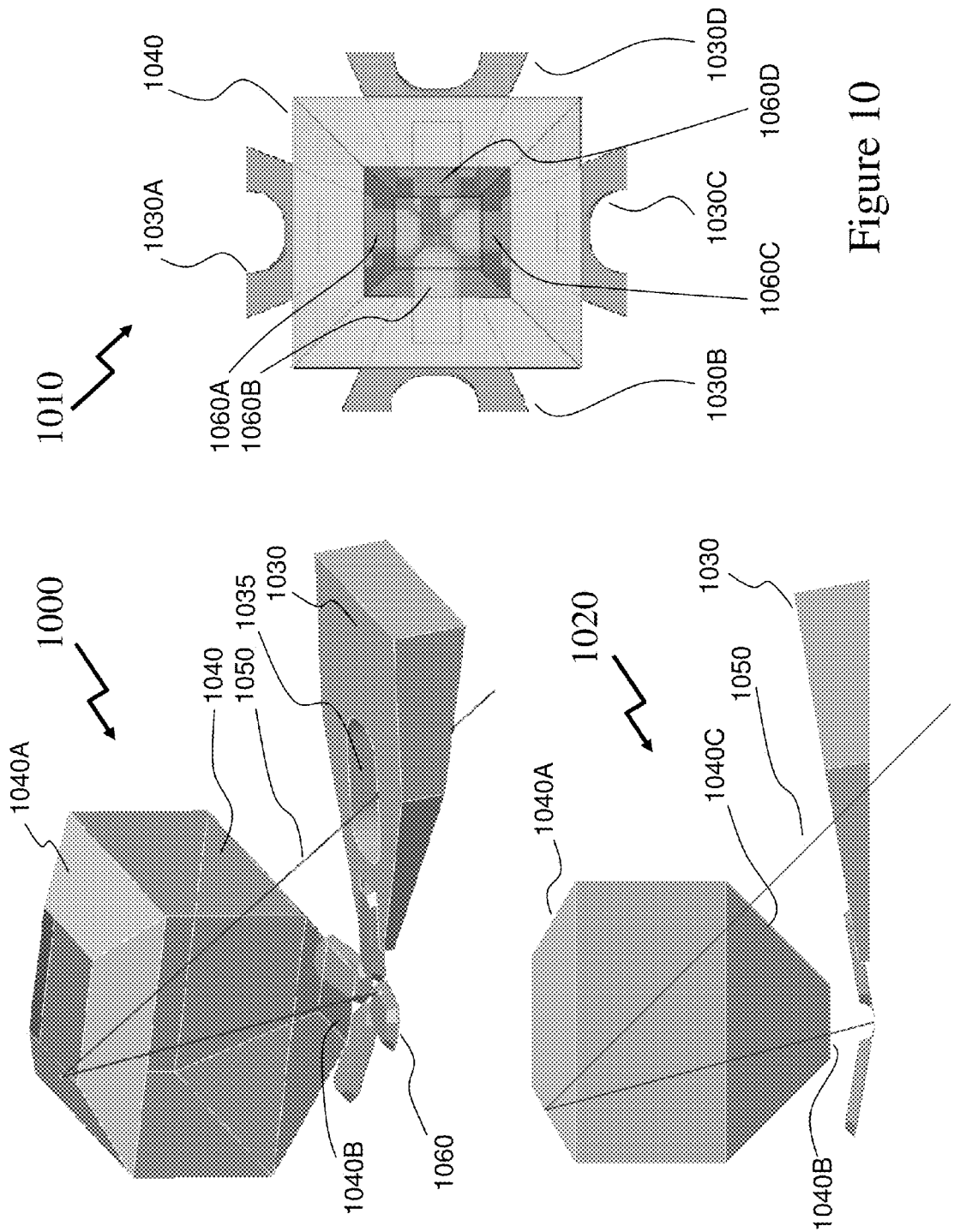
FIG. 10 depicts an embodiment of the invention with four cantilevers according to an embodiment of the invention.

Referring to FIG. 10 the usage of optical beam deflection within a multiprobe system is illustrated by the embodiments depicted in FIG. 10. Within this embodiment, a four probe system 1010 is depicted, although the principles of this embodiment may be extended to other numbers of probes determined by factors including but not limited to the overall design of the optical beam deflection component, placement and design of the cantilevers, and the microscope/AFM subsystem. Referring to first view 1000 the four cantilevers 1060 used for the measurements are shown to be in proximity, with the necessary clearance angle from the sample, not shown for clarity. The cantilever holder 1030 and the light path 1050 are drawn for a single probe, for simplicity and clarity. This shows more clearly how each probe is independent from the others, and can be moved or removed, without affecting any of the other probes.

The light beam 1050 from the optical beam deflection component, not shown for clarity, enters through an opening 1035 within the cantilever holder 1030 and enters the optical component 1040 through a first optically polished surface, not identified for clarity in first view 1000, and then travels towards a second optically polished surface 1040A, wherein it is reflected because of the metal coating deposited on the optically polished surface 1040A. This reflection redirects the light beam 1050 towards a third optically polished window 1040B, at the bottom, where it exits the component to reach a cantilever 1060. After reflecting from the cantilever 1060, the light beam 1050 returns along a similar path into the optical beam deflection component onto the photodetector and used to measure the cantilever angle.

Referring to second view 1020 a side view of the assembly is shown wherein the first to third optically polished windows 1040A, 1040C and 1040B are clearly visible and accordingly the path traced by the light beam 1050 within the optical component 1040. Four probe system 1010 depicts a plan view wherein first to fourth cantilevers 1060A through 1060D are visible through the optical component 1040 together with their respective cantilever holders 1030A through 1030D respectively.

It would be evident to one skilled in the art that other embodiments of the invention may be implemented wherein the incoming and outgoing light paths can be distinct and have different input and output angles and/or orientations to the cantilevers 1060. Further, multiple internal reflections can be used to redirect the light beam 1050 in any direction required for the desired application.

Within the embodiment depicted in FIG. 10 the optical component 1040 has four-fold symmetry allowing accommodation of four probe units simultaneously. Beneficially, this design allows for the incoming and reflected light beams to be managed with respect to their respective probe units with the use of as little as a single optical component, optical component 1040, and standard atomic resolution cantilevers 1060. Furthermore, this optical component 1040 allows for optical access of the sample and all four probes from directly above, as seen in the four probe system 1010 in FIG. 10. This allows the user to position all the probes on any desired location of the sample.

With such a fixed optical component 1040 positioned at the center of the system, directly above the sample and below a microscope objective, each of the four probe units can be independently positioned, adjusted, and operated, with the use of regular atomic force microscope cantilevers. It would be apparent that the optical component may be designed for other numbers of probes, for example 6, 8 etc through hexagonal, octagonal, and other polygonal optical component designs.

Figure 11:
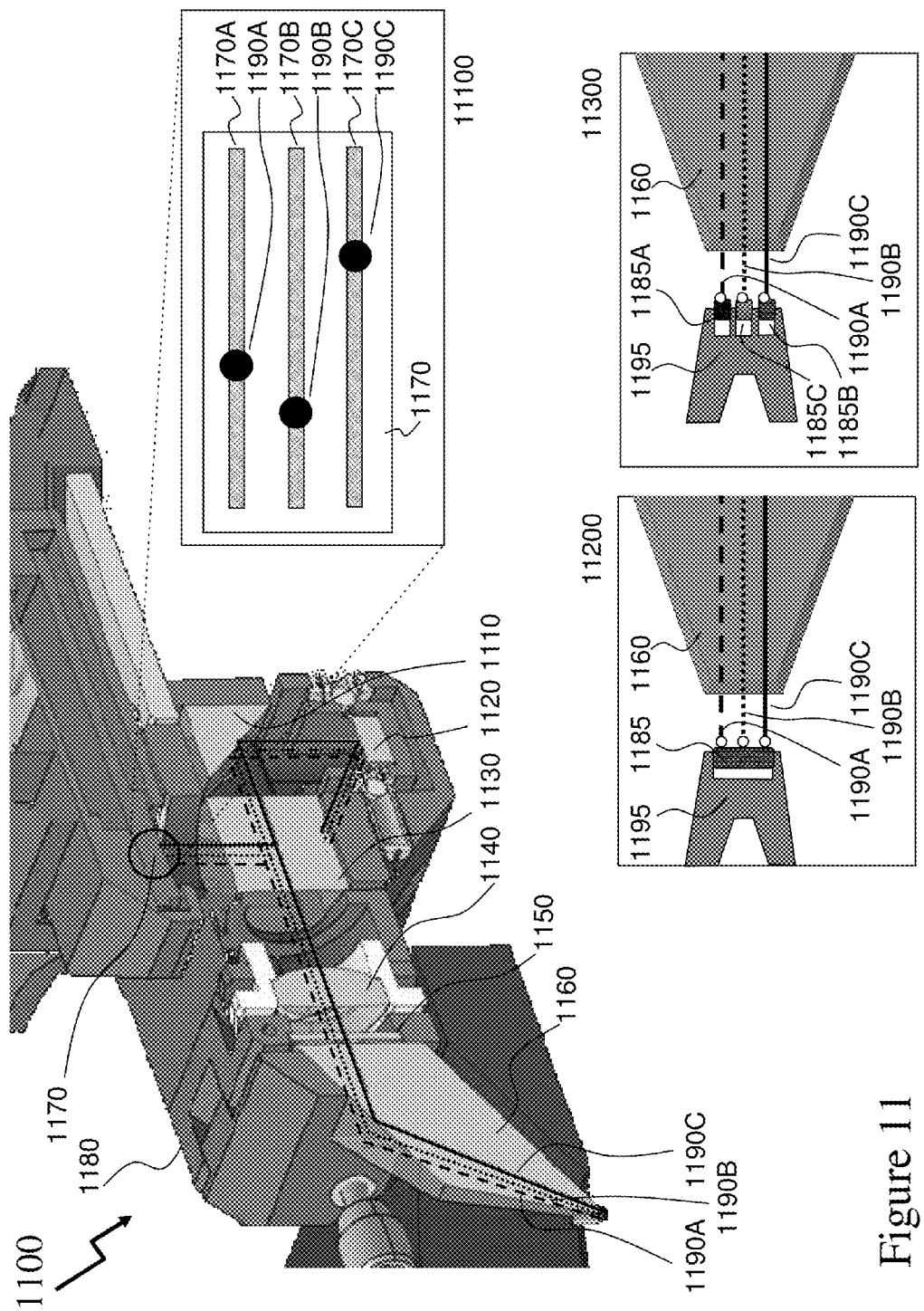
FIG. 11 depicts an optical beam deflection component according to an embodiment of the invention supporting multiple optical probes and cantilevers.

Referring to FIG. 11 there is shown optical beam deflection component 1100 according to an embodiment of the invention supporting multiple optical beams. As shown within the optical beam deflection component 1100 are first and second right angle mirrors 1110 and 1120, deviated by 90° upon each reflection that reflect incoming collimated optical beams. Each mirror is mounted on a rotational stage, which allows the adjustment of the optical beam orientation with 2 degrees of freedom (angular) allowing adjustment of the positioning of the focused laser spot onto a chosen position in the cantilever. The collimated optical beams then cross a polarizing beam splitter 1130, such that the outgoing optical beam is p-polarized for example, and are focused by a focusing lens assembly 1140, which is mounted on a thread to allow the position of the focal plane onto the cantilever. The optical beams then cross a quarter-wave plate 1150 that converts it to a circularly polarized optical beam, where it is coupled to the optical cantilever probe 1160. When reflected of the cantilevers, not shown for clarity, the optical beams propagate back through the optical assembly to the polarizing beam splitter 1130, where because they are now s-polarized, they reflect off the polarizing beam splitter 1130 rather than travelling straight through, as p-polarized light would, and then impinge on the optical photodetector assembly 1170. The optical cantilever probe 1160 being positioned through positioning stage 1180. Within the optical beam deflection component three optical beams 1190A though 1190C are depicted propagating from entry through the optical assembly to the optical cantilever probe 1160 and back to the optical photodetector assembly 1170.

First insert 11100 depicts a plan view of the optical photodetector assembly 1170. As shown, there are first to third linear optical detectors 1170A through 1170C together with optical beam spots 1190A through 1190C positioned on each. It would be evident that each optical beam spot 1190A through 1190C may be read out individually in position through the first to third linear optical detectors 1170A through 1170C respectively. These being for example linear CCD arrays that are available in pixel counts from 256 upwards to 6,000 or more.

Second insert 11200 depicts a view of the optical cantilever probe 1160 disposed with respect to a cantilever 1185 mounted in a cantilever mount 1195. As shown each of the optical beams 1190A though 1190C probe the sample or samples mounted to the common cantilever 1185. Referring to third insert 11300 the cantilever mount 1195 is now modified at its tip to accept three discrete cantilevers 1185A through 1185C so that each is probed by one of the optical beams 1190A though 1190C. Each discrete cantilever 1185A through 1185C being decoupled from one another unlike second insert 11200 wherein some coupling through the common cantilever 1185 may occur. In this manner multiple samples or measurements may be taken whilst the environment varies simultaneously to each.

Figure 12:
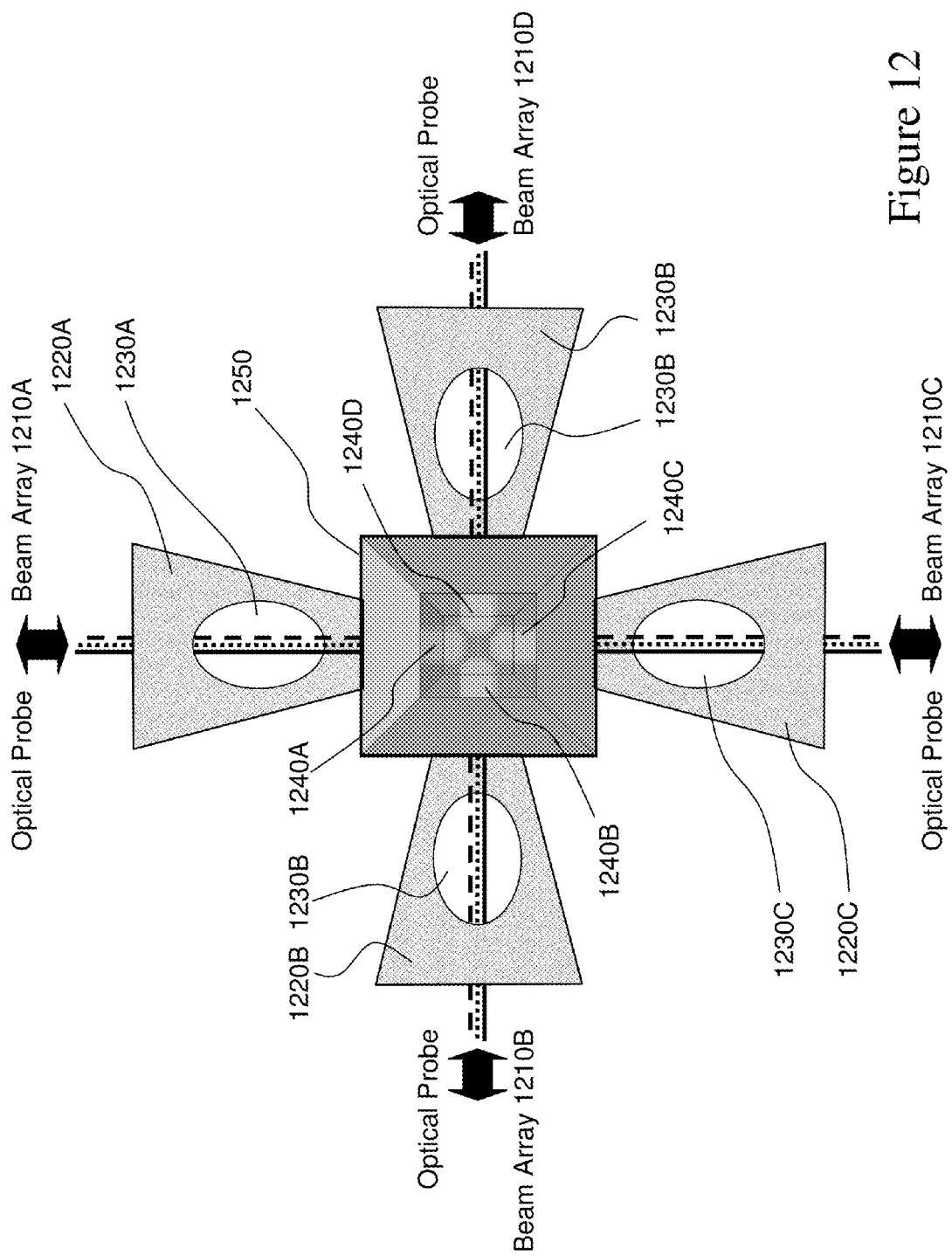
FIG. 12 depicts a sub-assembly according to an embodiment of the invention supporting multiple optical beam deflection components and multiple beams per component according to an embodiment of the invention.

Now referring to FIG. 12 there is depicted a view of a quad optical cantilever probe assembly with multiple probe beams to each optical cantilever probe assembly. Accordingly there is depicted optical component 1250 positioned above the four cantilevers 1240A through 1240D. Each of the four cantilevers 1240A through 1240D being mounted in the respective one of cantilever probe mounts 1220A through 1220D respectively. Accordingly each of the four cantilevers 1240A through 1240D is addressed with one of the optical probe beam arrays 1210A through 1210D respectively which are coupled to the four cantilevers 1240A through 1240D through access ports 1230A through 1230D respectively in the cantilever probe mounts 1220A through 1220D in a manner similar to that discussed supra in respect of FIG. 10.

The embodiments presented supra in respect of FIGS. 4 through 12 with respect of the optical beam deflection component have been presented with respect to measuring the deflection of a cantilever to which the sample is mounted. However, it would be evident that the optical probe may be also employed in other configurations that benefit from providing multiple optical probe components that may or may not employ multiple optical beams per probe component. In some configurations the optical beam component may employ one or more optical filters within the optical beam path, including tunable or switchable filters. Likewise the optical beam(s) coupled into the optical beam component may be monochromatic, narrowband sources, broadband sources, or tunable such as from a tunable laser source. Equally they may be modulated, unmodulated, continuous wave (CW) or pulsed and be the same or multiple wavelengths coupled through each optical beam displacement component.

As such they may be used for measuring deflection as in the embodiments presented supra in respect of FIGS. 4 through 12 or alternatively the optical probes may stimulate the sample triggering emission in response to the optical probe under varying environmental stimuli. In such variations the quarter-wave plate and polarising beam-splitter may be replaced with a standard beam-splitter alone or in combination with a filter. Optionally all designs might exploit an optical circulator to couple the received optical probe beam to the sample under test and the returned/emitted signal to the optical photodetector. Additionally, a grating in combination with an optical photodetector may be provided to derive wavelength dependent responses of samples.

Figure 13:
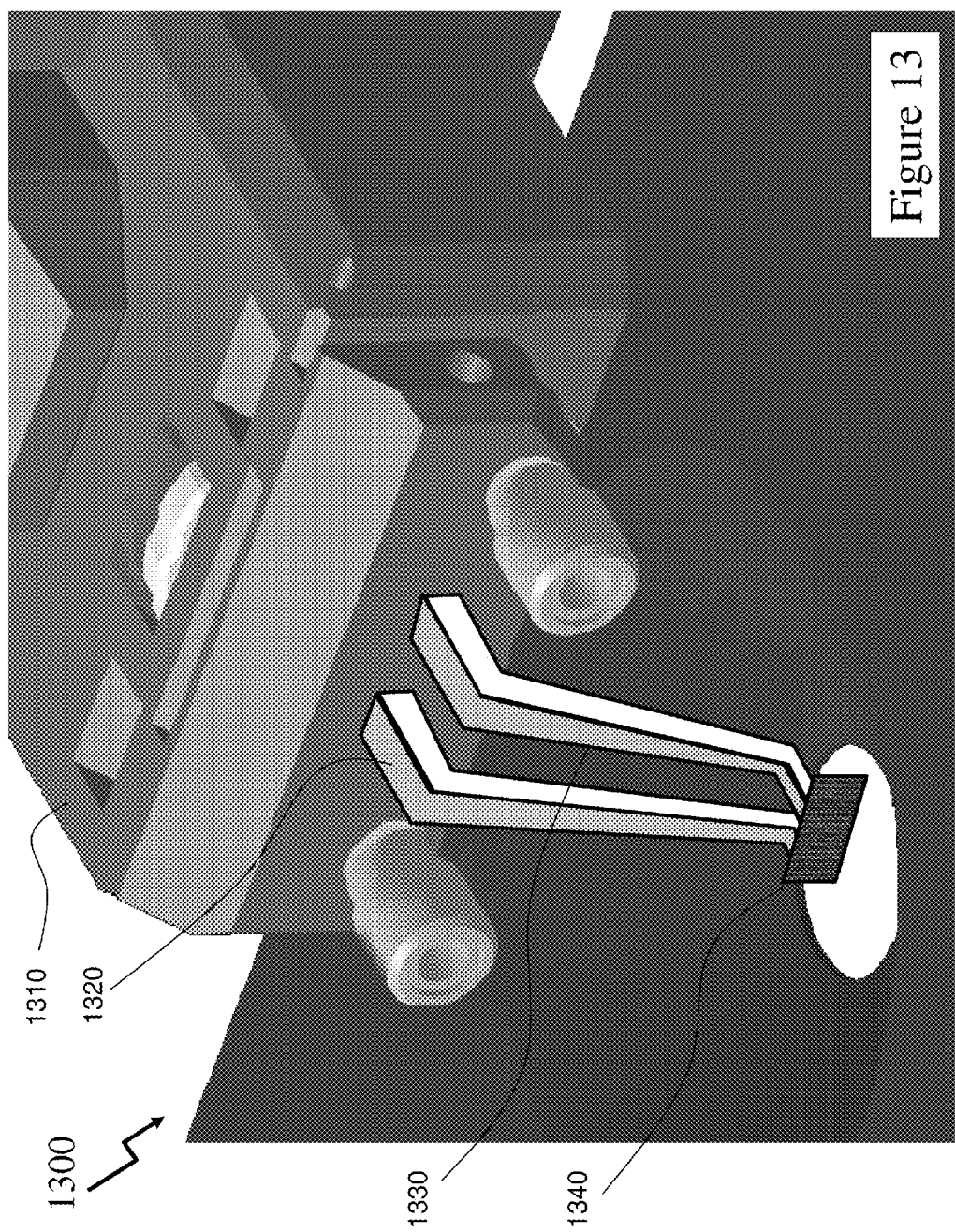
FIG. 13 depicts an embodiment of the invention wherein characterization is performed without exploiting a cantilever.

Referring to FIG. 13 there is shown an optical probe component 1300 according to an embodiment of the invention wherein characterization of the sample mounted to the sample holder 1340 is performed without a cantilever. Accordingly the optical probe component 1300 comprises a body 1310 containing the optical train including for example mirrors for coupling the input optical beam to a beam splitter, then to a lens for coupling to an optical probe 1320. Signals coupled back into the optical probe 1330, including but not limited to the reflected optical signal and optical signals emitted by the sample, and then coupled back via the lens into the optical train to the beam splitter. Where the optical measurement is an absorption then the reflected optical signal is coupled directly to the optical photodetector after the beam splitter whereas when the signal is emitted from the sample an optical filter may be employed to allow only the emitted optical signals to the optical photodetector.

Optionally such measurements can be performed with one optical beam of a multibeam optical beam deflection component whilst a second optical beam is deflected from a cantilever as described supra. It would be evident to one skilled in the art that the optical probe 1330 may be a specially designed solid optical glass component or that it may be other structures that operate through total internal reflection such as multi-mode optical fibre for example.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method comprising:
   providing a monolithic optical beam component for receiving a first optical beam from a first optical train, re-directing via total internal reflection the first optical beam to exit in a predetermined manner from an optical window forming part of the monolithic optical beam component; receiving a second optical beam through the optical window from a cantilever attached to a sample; and re-directing via total internal reflection the second optical beam to a second optical train for coupling to an optical photodetector;
   providing a sample holder for attaching the sample to be characterized, the sample when attached being positioned in predetermined orientation to the optical window of the monolithic optical beam component;
   positioning the optical beam component with respect to the sample holder; and
   determining a characteristic of the sample in dependence upon at least the second optical beam.

2. The method according to claim 1, wherein positioning the monolithic optical beam component with respect to the sample holder comprises adjusting micropositioning controllers forming part of a mounting for the monolithic optical beam component and adjusting the position of the monolithic optical beam component relative to the first optical train and second train simultaneously.

3. The method according to claim 1, wherein predetermined portions of the first optical train and the second optical train are common and are mounted in a housing to which the monolithic optical beam component is also mounted.

4. The method according to claim 3, wherein
the sample holder comprises the cantilever in a pendulum geometry,
the optical photodetector comprises a plurality of elements, and
the characteristic of the sample is determined in dependence upon at least the position of the second optical beam on the optical photodetector.

5. The method according to claim 1, wherein the optical window forming part of the monolithic optical beam component is approximately parallel to the surface of the cantilever but the first optical beam and second optical beam are approximately perpendicular to the sample.

6. The method according to claim 1, wherein the first optical train and second optical train share a quarter-wave plate, focussing lens assembly and polarizing beam splitter disposed in this order away from the monolithic optical beam component.

7. The method according to claim 1, wherein a predetermined portion of the monolithic optical beam component including a predetermined portion of the optical window may be immersed into a fluid surrounding the sample during measurements.

8. The method according to claim 1, wherein the monolithic optical beam component is uniform and does not itself provide any beam focussing and beam expansion other than that arising from the first optical beam and second optical beam due to the properties of at least one of the first optical train and the cantilever.

9. The method according to claim 1, wherein the first optical beam is characterised by a first wavelength and the second optical beam is characterised by being at least one of at the first wavelength when the second optical beam is reflected from the cantilever or the sample when the monolithic optical beam component is aligned to impinge upon the sample rather than the cantilever and at a second wavelength emitted by the sample in response to illumination at the first wavelength when the monolithic optical beam component is aligned to impinge upon the sample rather than the cantilever.

10. The method according to claim 1 wherein
the first optical beam is one of a plurality of first optical beams each coupled to the monolithic optical beam component through a different optical face of the monolithic optical beam component, and
the optical window is at least one of a different optical face of the monolithic optical beam component for each first optical beam and the same optical face for the plurality of first optical beams.

11. A method comprising:
providing a monolithic optical beam component for receiving a first optical beam from an optical train through a face of the monolithic optical beam component, directing the first optical beam to exit an optical window forming part of the monolithic optical beam component;
receiving a second optical beam through the optical window to the face of the monolithic optical beam component; and coupling the second optical beam to the optical train through the face of the monolithic optical beam component from a cantilever to be attached to a sample, wherein directing the first optical and second optical beam within the monolithic optical beam component between the face of the monolithic optical beam component and the optical window is through total internal reflection at exterior surfaces of the monolithic optical beam component;
providing a positioning system for adjusting the position of the optical beam component with respect to the sample wherein the sample is mounted substantially parallel to the optical window; and
providing the optical train for receiving an optical signal, processing the optical signal to generate the first optical beam, receiving the second optical beam, processing the second optical beam to generate a third optical beam, and coupling the third optical beam to an optical photodetector.

12. The method according to claim 11, wherein positioning the monolithic optical beam component with respect to the sample holder comprises adjusting micropositioning controllers forming part of a mounting for the monolithic optical beam component and adjusting the position of the monolithic optical beam component relative to the first optical train and second train simultaneously.

13. The method according to claim 11, wherein
the sample is mounted to the cantilever in a pendulum geometry, and
the optical photodetector provides an output determined upon at least the position of the third optical beam on the optical photodetector.

14. The method according to claim 11, wherein a predetermined portion of the monolithic optical beam component including a predetermined portion of the optical window may be immersed into a fluid surrounding the sample during measurements.

15. The method according to claim 11, wherein the first optical beam is characterised by a first wavelength and the second optical beam is characterised by being at least one of at the first wavelength when the second optical beam is reflected from the cantilever or the sample when the monolithic optical beam component is aligned to impinge upon the sample rather than the cantilever and at a second wavelength emitted by the sample in response to illumination at the first wavelength when the monolithic optical beam component is aligned to impinge upon the sample rather than the cantilever.

16. The method according to claim 11, further comprising coupling a fourth optical beam to the monolithic optical beam component through a different optical face of the monolithic optical beam component to that through which the first optical beam is coupled,
wherein the first optical beam and fourth optical beam are coupled to the sample by at least one of the same optical window and different optical windows of the monolithic optical beam component.

17. A method comprising:
determining the deflection of a plurality of cantilevers using an optical beam deflection component in conjunction with a sample manipulation component and an imaging component,
wherein the optical beam deflection component receives for each cantilever a first optical beam from an optical train through a different face of the optical beam deflection component; directs the first optical beam to exit an optical window forming another face of the optical beam deflection component onto a cantilever; receives a second optical beam through the optical window from the cantilever; and couples the second optical beam back to the optical train through the appropriate face of the optical beam deflection component and optical beam direction within the optical beam deflection component between each face of the optical beam deflection component and the optical window is through total internal reflection at exterior surfaces of the optical beam deflection component.

18. The method according to claim 17, wherein
the second optical beam is the first optical beam reflected from the cantilever, and
each optical window for each first optical beam is at least one of the same face and a different face of the optical beam deflection component.

19. The method according to claim 17, wherein the optical beam deflection component is positioned above the sample and the plurality of optical trains providing each first optical beam and receiving each second optical beam are below the sample.

20. The method according to claim 17, wherein
the optical beam deflection component is approximately uniform in refractive index,
the optical window is close to the sample, and
the optical window and another face of the optical beam deflection component opposite the optical window are parallel to one another allowing the sample area being measured to be viewed through the optical beam deflection component.

\* \* \* \* \*